(12) United States Patent  
Araki

(10) Patent No.: US 9,052,850 B2  
(45) Date of Patent: Jun. 9, 2015

(54) PRINTER DRIVER, STORAGE MEDIUM, AND INFORMATION PROCESSING APPARATUS

(71) Applicant: Shigeo Araki, Tokyo (JP)

(72) Inventor: Shigeo Araki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/220,958

(22) Filed: Mar. 20, 2014

(65) Prior Publication Data

US 2014/0204421 A1 Jul. 24, 2014

Related U.S. Application Data

(63) Continuation of application No. 12/720,199, filed on Mar. 9, 2010, now Pat. No. 8,705,089.

(30) Foreign Application Priority Data

Mar. 17, 2009 (JP) .................................. 2009-065256

(51) Int. Cl.
*G06F 3/12* (2006.01)
*G06F 9/445* (2006.01)
*G06K 1/00* (2006.01)

(52) U.S. Cl.
CPC ............ *G06F 3/1205* (2013.01); *G06F 3/1204* (2013.01); *G06F 3/1225* (2013.01); *G06F 9/44526* (2013.01)

(58) Field of Classification Search
CPC ... G06F 3/1205; G06F 3/1204; G06F 3/1225; G06F 9/44526
USPC .............. 358/1.1, 1.2, 1.4, 1.5, 1.6, 1.9, 1.11, 358/1.12, 1.13, 1.14, 1.15, 1.16, 1.17, 1.18
See application file for complete search history.

(56) References Cited

U.S. PATENT DOCUMENTS

| 7,284,246 B2 | 10/2007 | Kemp et al. |
| 2006/0028667 A1 | 2/2006 | Saito |
| 2008/0297840 A1 | 12/2008 | Miyata |
| 2010/0235846 A1* | 9/2010 | Yamamichi ................... 719/327 |

FOREIGN PATENT DOCUMENTS

| JP | 2001-75758 | 3/2001 |
| JP | 3745344 | 12/2005 |
| JP | 2007-122521 | 5/2007 |

* cited by examiner

*Primary Examiner* — Thierry L Pham
(74) *Attorney, Agent, or Firm* — Oblon, McClelland, Maier & Neustadt, L.L.P.

(57) ABSTRACT

A printer driver includes a plurality of modules, an interface unit that accepts the addition of plug-in including one or more additional modules for realizing a predetermined function, and a storage unit that stores setting information that defines information related to a partial process for realizing the predetermined function of the plug-in. The plurality of modules performs a process that is the partial process for realizing the predetermined function and cannot be realized in the additional modules included in the plug-in in accordance with the setting information.

5 Claims, 26 Drawing Sheets

FIG. 3

```
[
 {"type" : "ComboBox", "name" : "layout",
   "axis" : {
       "x":25, "y":30
    301  }
 },
```
} COMPACTION SETTING LAYOUT DATA

```
 {"type" : "CheckBox", "name" : "booklet",
   "axis" : {
        "x":25, "y":60
        }
 },
```
} SADDLE STITCH SETTING LAYOUT DATA

```
 {"type" : "SpinBox", "name" : "copies",
   "axis" : {
        "x":25, "y":90
        }
 },
```
} NUMBER OF COPIES SETTING LAYOUT DATA

```
 {"type" : "EditBox", "name" : "userid",
   "axis" : {
        "x":25, "y":120
        }
 },
```
} ID SETTING LAYOUT DATA ACCORDING TO USER

```
 {"type" : "EditBox", "name" : "papersize",
   "axis" : {
        "x":170, "y":90
        }
 }
]
```
} PAPER SIZE SETTING LAYOUT DATA

FIG. 5

```
<item name="layout" type="pickone">
  <constraint fixvalue="off">
  <condition expression="booklet == on"/>
  </constraint>
  <pickone name="off"/>
  <pickone name="2in1"/>
  <pickone name="4in1"/>
</item>
```
} COMPACTION SETTING INFORMATION 501

```
<item name="booklet" type="pickone">
  <pickone name="off"/>
  <pickone name="on"/>
</item>
```
} SADDLE STITCH SETTING INFORMATION

```
<item name="copies" type="number">
  <range min="1" max="999">
</item>
```
} NUMBER OF COPIES SETTING INFORMATION

```
<item name="userid" type="string">
  <string min="1" max="8" chartype="alphanumeric">
</item>
```
} ID SETTING INFORMATION ACCORDING TO USER

```
<item name="papersize" type="pickone">
  <pickone name="a3"/>
  <pickone name="a4"/>
</item>
```
} PAPER SIZE SETTING INFORMATION

FIG. 6

```
{
        "devmode" :
        [
                        "layout",
                        "booklet",
                        "copies",
                        "papersize"
        ],
        "registory" :
        [
                        "userid"
        ]
}
```

```
[
  {"type" : "PluginDialogButton", "name" : "stamp",
   "axis" : {
              "x":170, "y":120
            }
  }
]
```
DESCRIPTION RELATED TO PLUG-IN STAMP

FIG. 9

```
{
    "devmode" :
    [
        "stamp",         ⎫
        "stamp_image",   ⎪  DESCRIPTION
        "stamp_axis_x",  ⎬  RELATED TO
        "stamp_axis_y"   ⎪  PLUG-IN STAMP
                         ⎭
    ],
    "registry" :
    []
}
```

FIG. 10

```
<item name="borderline" type="pickone">
  <constraint fixvalue="off">
    <condition expression="layout != off"/>
  </constraint>
  <pickone name="off"/>
  <pickone name="on"/>
</item>
```
DESCRIPTION RELATED TO PLUG-IN BORDERLINE

FIG. 12

```
[
  {"type" : "ComboBox", "name" : "layout",
    "axis" : {
          "x":25, "y":30
          }
  },
  {"type" : "CheckBox", "name" : "booklet",
    "axis" : {
          "x":25, "y":60
          }
  },
  {"type" : "SpinBox", "name" : "copies",
    "axis" : {
          "x":25, "y":90
          }
  },
  {"type" : "EditBox", "name" : "userid",
    "axis" : {
          "x":25, "y":120
          }
  },
  {"type" : "EditBox", "name" : "papersize",
    "axis" : {
          "x":170, "y":90
          }
  },
  {"type" : "CheckBox", "name" : "borderline",
    "axis" : {
          "x":170, "y":30
          }
  },
  {"type" : "PluginDialogButton", "name" : "stamp",
    "axis" : {
          "x":170, "y":120
          }
  }
]
```

- DESCRIPTION RELATED TO CORE DRIVER (ComboBox layout through EditBox papersize)
- DESCRIPTION RELATED TO PLUG-IN BORDERLINE (CheckBox borderline)
- DESCRIPTION RELATED TO PLUG-IN STAMP (PluginDialogButton stamp)

FIG. 13

PRINT SETTING

LAYOUT:
[OFF ▼]

☐ BORDERLINE —1301

☐ BOOKLET

COPIES:
[1 ⬍]

PAPER SIZE:
[OFF ▼]

USER ID:
[1234]

[STAMP] —1302

[ OK ]  [ CANCEL ]

FIG. 14

STAMP SETTING

☑ STAMP

AXIS X
[30 ⬍]

STAMP IMAGE
[STAMP ▼]

AXIS Y
[30 ⬍]

30
30 — SAMPLE

[ OK ]  [ CANCEL ]

FIG. 15

```
{
    "devmode" :
    [
        "layout",         ⎫ DESCRIPTION RELATED
        "booklet",        ⎬ TO CORE DRIVER
        "copies",         ⎭
        "papersize",      ⎫ DESCRIPTION RELATED
        "borderline",     ⎬ TO PLUG-IN BORDERLINE
        "stamp",          ⎫
        "stamp_image",    ⎬ DESCRIPTION RELATED
        "stamp_axis_x",   ⎬ TO PLUG-IN STAMP
        "stamp_axis_y"    ⎭
    ],
    "registory" :
    [                     ⎫ DESCRIPTION RELATED
        "userid",         ⎬ TO CORE DRIVER
    ]                     ⎭
}
```

FIG. 16

```
<item name="layout" type="pickone">
  <constraint fixvalue="off">
    <condition expression="booklet == on"/>
  </constraint>
  <pickone name="off"/>
  <pickone name="2in1"/>
  <pickone name="4in1"/>
</item>

<item name="booklet" type="pickone">
  <pickone name="off"/>
  <pickone name="on"/>
</item>

<item name="papersize" type="pickone">
  <pickone name="a3"/>
  <pickone name="a4"/>
</item>

<item name="copies" type="number">
  <range min="1" max="999">
</item>

<item name="userid" type="string">
  <string min="1" max="8" chartype="alphanumeric">
</item>
```
⎫
⎬ DESCRIPTION RELATED TO CORE DRIVER
⎭

```
<item name="borderline" type="pickone">
  <constraint fixvalue="off">
    <condition expression="layout != off"/>
  </constraint>
  <pickone name="off"/>
  <pickone name="on"/>
</item>
```
⎫
⎬ DESCRIPTION RELATED TO PLUG-IN BORDERLINE
⎭

FIG. 17

```
[ui_plugin]
stamp = stamp.dll

[setting_manager_plugin]
stamp = stamp.dll

[graphic_plugin]
stamp = stamp.dll
borderline = borderline.dll
```

FIG. 27

```
[ui_plugin]
stamp = stamp.dll
borderline = borderlineUI.dll ⌇―2701

[setting_manager_plugin]
stamp = stamp.dll

[graphic_plugin]
stamp = stamp.dll
borderline = borderline.dll
```

FIG. 28

```
[
  {"type" : "ComboBox", "name" : "layout",
    "axis" : {
        "x":25, "y":30
      }
  },
  {"type" : "CheckBox", "name" : "booklet",
    "axis" : {
        "x":25, "y":60
    }
  },
  {"type" : "SpinBox", "name" : "copies",
    "axis" : {
        "x":25, "y":90
    }
  },
  {"type" : "EditBox", "name" : "userid",
    "axis" : {
        "x":25, "y":120
    }
  },
  {"type" : "EditBox", "name" : "papersize",
    "axis" : {
        "x":170, "y":90
    }
  },
  {"type" : "PluginDialogButton", "name" : "borderline",  ⸺2801
    "axis" : {
        "x":170, "y":30
    }
  },
  {"type" : "PluginDialogButton", "name" : "stamp",
    "axis" : {
        "x":170, "y":120
    }
  }
]
```

PRINTER DRIVER, STORAGE MEDIUM, AND INFORMATION PROCESSING APPARATUS

CROSS-REFERENCE TO RELATED APPLICATIONS

This application is a continuation of and claims the benefit of priority from U.S. Ser. No. 12/720,199, filed Mar. 9, 2010, which claims the benefit of priority from Japanese Patent Application No. 2009-065256, filed on Mar. 17, 2009, the entire contents of each of which are incorporated herein by reference.

BACKGROUND OF THE INVENTION

1. Field of the Invention

The present invention relates to a printer driver, a storage medium, and an information processing apparatus.

2. Description of the Related Art

In recent years, various suggestions are made on a computer environment of an office to improve an efficiency of a work.

Accordingly, it has been increasingly requested to customize and sell an image forming apparatus including a printer, a multifunction product, or the like in such a manner that only necessary functions may be utilized. Therefore, a printer to which a function as a plug-in may be added has been developed. When a function is added to a printer as a plug-in, it is also necessary to expand the function of a printer driver that controls the printer in such a manner that an additional function may be used.

Furthermore, even when a function is not added to a printer, there is a need of expanding a function to a single piece of printer driver.

However, when the function of a printer driver is expanded, it is usually necessary to recompile the printer driver and reinstall it in a customer environment. Such a procedure deteriorates the convenience of a user.

Therefore, when the function of a printer driver is expanded, a technology for adding the function to the printer driver as a plug-in without recompilation and reinstallation has been proposed.

For example, Japanese Patent Application Laid-open No. 2004-005608 discloses a technology for making a device driver have a means for detecting the addition of plug-in and informing the detected plug-in of an event transmitted from an operating system to expand a function. As a result, dynamic expansion of the function of the printer driver is made possible without recompiling the device driver.

However, when a new function is added as a plug-in in a conventional technology including Japanese Patent Application Laid-open No. 2004-005608, a lot of processes such as the display of screen, the saving of setting, the control of print, and the like should be performed to realize the function. However, it is difficult to use the existing processing unit of the printer driver to perform these processes. Therefore, there is a problem in that the conventional technology requires a high development cost because a plug-in should be developed to realize all the processes.

SUMMARY OF THE INVENTION

It is an object of the present invention to at least partially solve the problems in the conventional technology.

According to an aspect of the present invention a printer driver includes a plurality of modules, an interface unit that accepts addition of a plug-in that includes one or more additional modules for realizing a predetermined function, a storage unit that stores setting information that defines a partial process executed by one or more of the modules in order to realize the predetermined function of the plug-in, wherein the plurality of modules performs a process that is the partial process for realizing the predetermined function and cannot be realized in the additional modules included in the plug-in in accordance with the setting information.

According to another aspect of the present invention a computer-readable storage medium stores a program for causing a computer to execute, an installation unit that installs a plug-in that includes one or more additional modules for realizing a predetermined function on a printer driver that includes a plurality of modules, an interface unit that accepts addition of the plug-in including one or more additional modules for realizing the predetermined function, and a storage unit, and an addition unit that adds, to the storage unit, setting information that defines information related to a process that is a partial process for realizing the predetermined function executed by the plurality of modules and cannot be realized in the additional modules included in the plug-in.

According to still another aspect of the present invention an information processing apparatus has a printer driver that includes a plurality of modules, an interface unit that accepts addition of a plug-in that includes one or more additional modules for realizing a predetermined function, a storage unit that stores setting information that defines a partial process executed by one or more of the modules in order to realize the predetermined function of the plug-in, wherein the plurality of modules performs a process that is the partial process for realizing the predetermined function and cannot be realized in the additional modules included in the plug-in in accordance with the setting information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of layout information;

FIG. 5 is a diagram illustrating an example of function information;

FIG. 6 is a diagram illustrating an example of save destination information when function information is information of FIG. 5;

FIG. 9 is a diagram illustrating an example of additional save destination information included in the stamp plug-in installer;

FIG. 10 is a diagram illustrating an example of additional function information of a borderline plug-in installer;

FIG. 12 is a diagram illustrating layout information after adding a stamp plug-in and a borderline plug-in;

FIG. 13 is a diagram illustrating an example of the print setting screen displayed by the screen display unit of the core driver after adding the stamp plug-in and the borderline plug-in;

FIG. 14 is a diagram illustrating an example of a setting screen of the stamp plug-in that is displayed by a screen display unit of the stamp plug-in;

FIG. 15 is a diagram illustrating save destination information after adding the stamp plug-in and the borderline plug-in;

FIG. 16 is a diagram illustrating function information after adding the stamp plug-in and the borderline plug-in;

FIG. 17 is a diagram illustrating plug-in information after adding the stamp plug-in and the borderline plug-in;

FIG. 22 is a sequence diagram illustrating a process performed in the printer driver in accordance with a set value input through the displayed setting screen when adding the stamp plug-in and the borderline plug-in;

FIG. 23 is a sequence diagram illustrating the termination process of the setting screen when adding the stamp plug-in and the borderline plug-in;

FIG. 25 is a sequence diagram illustrating a process for performing a print from an application when adding the stamp plug-in and the borderline plug-in;

FIG. 26 is a block diagram illustrating the configuration of the PC when adding a screen display unit to the borderline plug-in;

FIG. 27 is a diagram illustrating an example of plug-in information when adding the screen display unit to the borderline plug-in;

FIG. 28 is a diagram illustrating an example of layout information after a description is modified by an installer when adding the screen display unit to the borderline plug-in;

FIG. 29 is a diagram illustrating an example of a setting screen displayed by the screen display unit of the core driver when adding the screen display unit to the borderline plug-in;

FIG. 30 is a diagram illustrating an example of a setting screen displayed by the screen display unit of the borderline plug-in.

DETAILED DESCRIPTION OF THE PREFERRED EMBODIMENTS

Exemplary embodiments of a printer driver, a storage medium, and an information processing apparatus according to the present invention will be explained in detail below with reference to the accompanying drawings. However, the present invention is not limited to these embodiments.

First Embodiment

Figure 1:
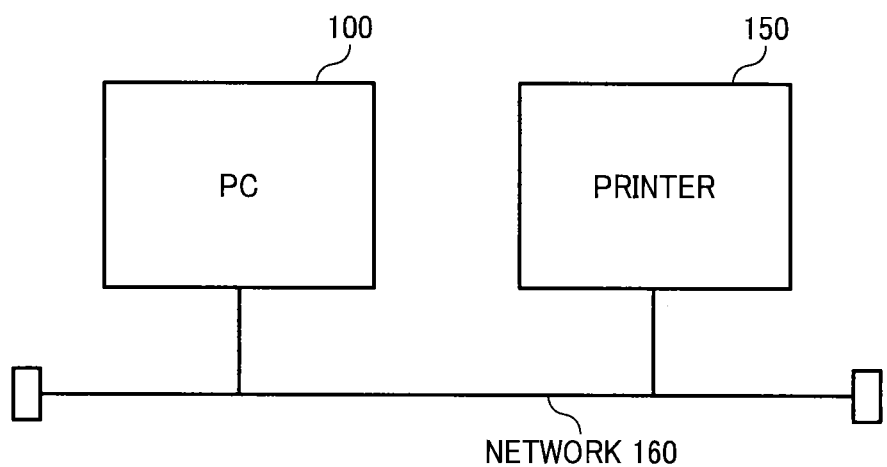
FIG. 1 is a diagram illustrating the entire configuration of a printer system according to a first embodiment.

FIG. 1 is a diagram illustrating the entire configuration of a printer system according to the first embodiment of the present invention. As illustrated in FIG. 1, according to the present embodiment, it is assumed that a PC 100 and a printer 150 are connected to each other via a network 160. The printer 150 performs a print process in response to a print request from the PC 100.

Figure 2:
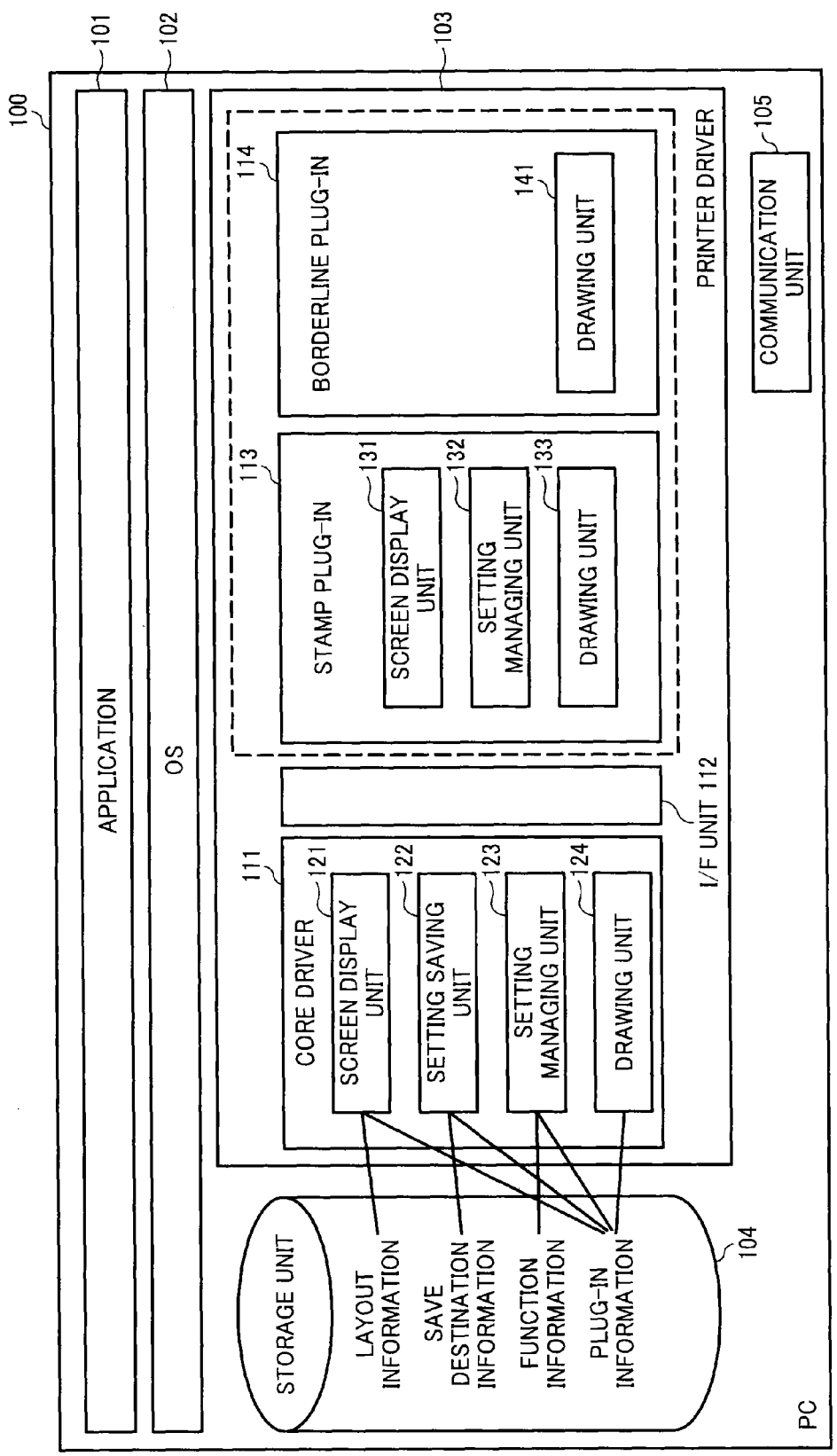
FIG. 2 is a block diagram illustrating the configuration of a PC according to the first embodiment.

FIG. 2 is a block diagram illustrating the configuration of the PC 100. As illustrated in FIG. 2, the PC 100 includes an application 101, an OS 102, a printer driver 103, a storage unit 104, and a communication unit 105. Functional blocks inside the printer driver 103 illustrated in FIG. 2 indicate functions or means for realizing the control of the printer 150.

The communication unit 105 transmits and receives information to and from the printer 150, with which the communication unit 105 is connected, via the network 160.

It is assumed that the application 101 is a software utilized by a user. When the user wants to print data edited by the application 101, the application 101 accepts a print request. In this case, the application 101 does not generate print data on its own for the printer 150 and transfers the print request and print information to the OS 102.

The OS 102 is a program that controls hardware and software of the PC 100. The OS 102 performs the starting of a program, the read-in control of information, saving control, and the like. As a representative example among operating systems, there is known UNIX (registered trademark).

Moreover, the OS 102 transfers information on print target together with the print request transferred from the application 101 to the printer driver 103.

The storage unit 104 is assumed to be a unit that stores various information. The storage unit 104 stores setting information that defines information related to a partial process for realizing a predetermined function (for example, stamp, borderline, and the like) performed by a plug-in. As an example, the setting information includes layout information, save destination information, function information, and plug-in information. The setting information (layout information, save destination information, function information, and plug-in information) defines a partial process performed by each module to realize the function of the plug-in. The partial process includes all information required for process such as a set value for use in process or display information for modifying a set value related to the function of plug-in.

It is assumed that the plug-in information is information in which a plug-in added via an interface unit 112 is described. A screen display unit 121, a setting saving unit 122, and a setting managing unit 123, which are included in a core driver 111, refer to the plug-in information of the storage unit 104 when confirming the installed plug-in. As a result, the installed plug-in can be confirmed.

The printer driver 103 includes the core driver 111, the interface unit 112, a stamp plug-in 113, and a borderline plug-in 114.

The core driver 111 includes the screen display unit 121, the setting saving unit 122, the setting managing unit 123, and a drawing unit 124. The core driver 111 has a standard function as the printer driver 103. It is assumed that the screen display unit 121, the setting saving unit 122, the setting managing unit 123, and the drawing unit 124 form a module group for fulfilling the function as the printer driver 103.

The module group included in the core driver 111 carries out a partial process that cannot be performed by a module included in the installed plug-in in accordance with the setting information (layout information, save destination information, function information, and plug-in information) in addition to a print process.

The screen display unit 121 displays a print setting screen. The screen display unit 121 according to the present embodiment displays a print setting screen and the like based on the layout information stored in the storage unit 104.

It is assumed that the layout information is information in which the displaying method or the display position of each setting is described. The layout information describes the layout of UI component displayed on the setting screen.

FIG. 3 is a diagram illustrating an example of layout information. It is assumed that a stamp plug-in and a borderline plug-in are not yet added to the layout information illustrated in FIG. 3. The layout information illustrated in FIG. 3 is described in a JSON format. However, the layout information may be described in other formats.

In an example of layout information illustrated in FIG. 3, layout data is described for each UI component. Layout data for each UI component has "type", "name", and "axis" as attributes.

The "type" indicates the type of UI component. "ComboBox" that is the value of type indicates the display by a combo box component. "CheckBox" indicates the display by a check box component. "SpinBox" indicates the display by a spin box component. "EditBox" indicates the display by an edit box component.

The "name" indicates the name of setting. Among the values of name, "layout" designates that it is compaction setting, "booklet" shows that it is bookbinding setting, "papersize" designates that it is printing paper setting, "copies" designates that it is the number of copies setting, and "userid" designates that it is ID setting according to user.

The "axis" indicates the coordinates of a display position. An "x" that is the attribute of the axis indicates horizontal-direction coordinates from the upper-left original point of dialog box. A "y" indicates vertical-direction coordinates from the upper-left original point of dialog box. For example, in an axis 301 of the compaction setting, it is described that the layout is performed at the horizontal position of 25 and the vertical position of 30 in the combo box component.

The screen display unit 121 reads layout information from the storage unit 104, generates a setting screen in accordance with the read layout information, and displays the setting screen.

In addition, the screen display unit 121 displays only setting items managed by the setting managing unit 123 among the UI components described in the layout information.

Figure 4:
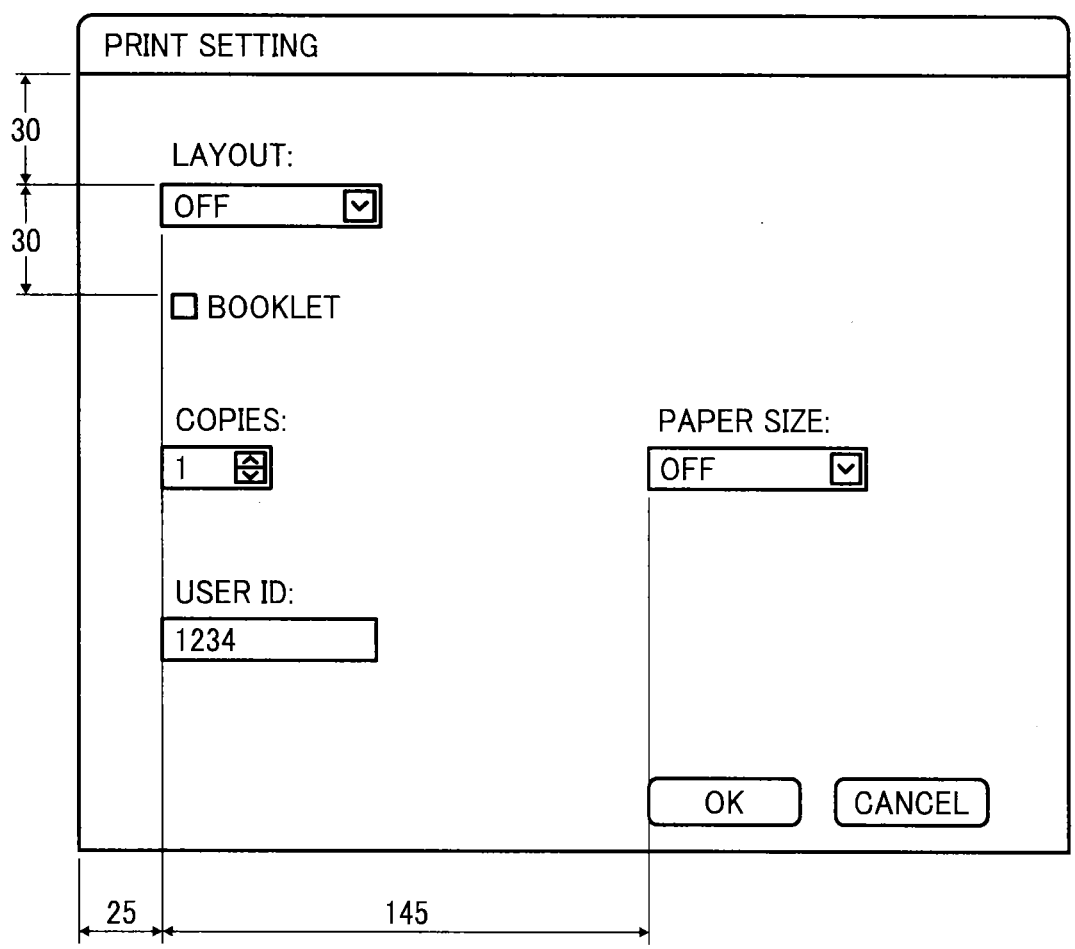
FIG. 4 is a diagram illustrating an example of a print setting screen displayed by a screen display unit of a core driver when the layout information illustrated in FIG. 3 is read.

FIG. 4 is a diagram illustrating an example of a print setting screen displayed by the screen display unit 121 of the core driver 111 when reading the layout information illustrated in FIG. 3. In an example illustrated in FIG. 4, it is assumed that each setting described in the layout information is managed by the setting managing unit 123. As illustrated in FIG. 4, a compaction setting layout is located at "Layout", a saddle stitch setting layout is located at "Booklet", the number of copies setting layout is located at "copies", an ID setting layout according to user is located at "Userid", and a paper size setting layout is located at "Papersize".

An "OK" button illustrated in FIG. 4 is a button that saves the modification of print setting. A "Cancel" button is a button that performs a cancel. It is assumed that the OK button and Cancel button are provided regardless of the layout information.

Returning to FIG. 2, the setting managing unit 123 manages a setting (the set value and the like of each setting) used for a print process. The setting managing unit 123 according to the present embodiment manages a print setting and solves the settable range of each setting and a prohibition between setting values of the print setting.

Moreover, the setting managing unit 123 manages a setting (the set value and the like of each setting) used for a print process on the basis of the function information stored in the storage unit 104.

The settable range of each setting value and the prohibition between settings are described in the function information. As a specific example, each setting and its prohibition of the printer driver are described in the function information.

FIG. 5 is a diagram illustrating an example of function information. It is assumed that the stamp plug-in and the borderline plug-in are not yet added to the function information illustrated in FIG. 5. The function information illustrated in FIG. 5 is described in an XML format. However, the function information may be described in other formats.

In an example of the function information illustrated in FIG. 5, the information of each setting is defined for each "item" tag. The item tag has the attributes of "name" and "type".

The attribute "name" indicates the name of setting. The attribute "name" corresponds to the "name" of layout information. The "layout" that is the value of the attribute name designates that it is a compaction setting, "booklet" designates that it is bookbinding setting, "papersize" designates that it is printing paper setting, "copies" designates that it is the number of copies setting, and "userid" designates that it is ID setting according to user.

The attribute "type" indicates the type of a set value to be input. The "pickone" that is the value of "type" designates an alternative form, "string" designates a character string input form, and "number" designates a numeric value input form.

The "item" tag can have a "constraint" tag like a compaction setting 501 illustrated in FIG. 5. The "constraint" tag indicates the prohibition information of setting of an "item" tag that is a parent tag. The "fixvalue" that is an attribute inside the "constraint" tag indicates a set value that is forcibly modified when the prohibition condition accords with the "constraint" tag.

The "constraint" tag can have a "condition" tag like the compaction setting 501 illustrated in FIG. 5. The "condition" tag indicates the prohibition condition of the "constraint tag" that is a parent tag and "expression" that is an attribute indicates its condition.

In the compaction setting, the prohibition condition accords with the "constraint" tag when "booklet" is, for example, ON and the set value of "layout" (compaction setting) is forcibly modified to OFF.

A "pickone" tag indicates a selectable set value when the "type" of the "item" tag that is a parent tag is an alternative form. The attribute "name" inside the "pickone" tag sets therein a set value. Moreover, the "pickone" tag can have a "constraint tag" even if this is different from the example illustrated in FIG. 5. In this manner, the "pickone" tag, in other words, an alternative can also have prohibition information.

In the case of "name" that is the attribute of "pickone" in the compaction setting, "off" indicates function off, "2in1" indicates 2-in-1 print, and "4in1" indicates 4-in-1 print. Moreover, in the saddle stitch setting, "off" indicates function off and "on" indicates function on. Furthermore, in the paper size setting, "a3" indicates A3 paper and "a4" indicates A4 paper.

A "range" tag indicates a selectable range when the "type" of the "item" tag that is a parent tag is a numeric value type. In this case, "min" indicates the minimum value and "max" indicates the maximum value.

A "string" tag indicates a selectable character string when the "type" of the "item" tag that is a parent tag is a character string format. In this case, "min" indicates the minimum number of characters and "max" indicates the maximum number of characters. "chartype" indicates the type of character. "alphanumeric" of the set value of the "chartype" indicates that a character string consisting of a numeric value and alphabet can be input. As above, an operation to be performed by the setting managing unit 123 of the core driver 111, in other words, a technique for managing set values of each setting is described in the function information.

The setting managing unit 123 reads the function information described above to decide the type of setting to be managed and its line boundary character check and perform the setting related to the print process.

The setting saving unit 122 saves the setting values managed by the setting managing unit 123 in a data save area such as "Devmode" or the registry of the OS 102 (not illustrated). Moreover, the setting saving unit 122 refers to the save destination information stored in the storage unit 104.

It is assumed that the "Devmode" is a structure provided from the OS 102 to hold various setting related to print.

Information on a saving place of each setting is described in the save destination information. FIG. 6 is a diagram illustrating an example of save destination information when function information is the information of FIG. 5. In an example illustrated in FIG. 6, the save destination information is described in a JSON format. However, the save destination information may be described in other formats.

Each setting name described in keys called "Devmode" and "registory" of the save destination information has relationship with each setting name described in the function information and the layout information. For example, "layout" indicates compaction setting, "booklet" indicates bookbinding setting, "papersize" indicates printing paper setting, "copies" indicates the number of copies setting, and "userid" indicates ID setting according to user.

The settings indicated by the setting names described in the key called "Devmode" are saved in a "Devmode" structure. Moreover, the setting indicated by the setting name described in the key called "registory" is saved in a registry. It is assumed that the saved settings are set values managed by the setting managing unit 123.

In this manner, the setting saving unit 122 reads the save destination information to decide the saving place of each setting. The setting managing unit 123 reads out each setting value from the decided saving place to perform setting required for a print process.

The drawing unit 124 converts a print request data transmitted from the application 101 into a print instruction that can be interpreted by the printer. The converted print instruction is transmitted to the printer driver 103 via the communication unit 105.

Returning to FIG. 2, it is assumed that the stamp plug-in 113 and the borderline plug-in 114 surrounded by a dashed line 130 are a plug-in that is a dynamic link library that adds a function to the core driver 111. The stamp plug-in 113 and the borderline plug-in 114 are configured with one or more modules to realize a predetermined function.

A general plug-in is configured with one or more modules of the screen display unit, the setting managing unit, and the drawing unit.

The screen display unit of the plug-in displays a setting screen related to the function of plug-in in accordance with the display instruction output from the screen display unit 121 of the core driver 111 via the interface unit 112. Moreover, the setting managing unit of the plug-in solves the settable range of each setting value and the prohibition between the setting values on the function of plug-in in accordance with an instruction output from the setting managing unit 123 of the core driver 111 via the interface unit 112. Furthermore, the drawing unit of the plug-in realizes a drawing function performed by using the function of plug-in.

In other words, the expanded portion of the screen display unit 121 of the core driver 111 becomes the screen display unit of the plug-in. The expanded portion of the setting managing unit 123 of the core driver 111 becomes the setting managing unit of the plug-in. Furthermore, the expanded portion of the drawing unit 124 of the core driver 111 becomes the drawing unit of the plug-in.

The printer driver 103 according to the present embodiment has a characteristic that the added plug-in does not necessarily require all of three modules described above. In other words, the conventional plug-in requires to create all of three modules in order to realize a function to be added. However, according to the present embodiment, any plug-in to be added does not require to create all modules by utilizing the module of the core driver 111. As a result, the development burden of plug-in is reduced.

To utilize the module of the core driver 111 as an alternative module, it is necessary to update foreign files referred to by each module of the core driver 111. In other words, an additional plug-in can be created only by adding a necessary module and updating setting information referred to by each module of the core driver 111.

The interface unit 112 is an interface that accepts the addition of plug-in. When a plug-in is added to the printer driver 103, each module of the added plug-in can be called via the interface unit 112. Moreover, the added plug-in can also call each module of the core driver 111 via the interface unit 112.

The addition of a plug-in related to the printer driver 103 according to the present embodiment is performed by adding the dynamic link library of the plug-in per se and adding descriptions on one or more of layout information, function information, save destination information, and plug-in information. As a result, a plug-in can be easily added to the printer driver 103 which is installed in the PC 100 in advance. In other words, a user does not need to reinstall a printer driver. In the present embodiment, it will be explained about an example of adding the stamp plug-in 113 and the borderline plug-in 114. The stamp plug-in 113 has a stamp function for printing the designated stamp at the designated coordinates. Moreover, the borderline plug-in 114 has a partition line function for adding a partition line to a logical page at the time of compaction.

Figures 7, 8:
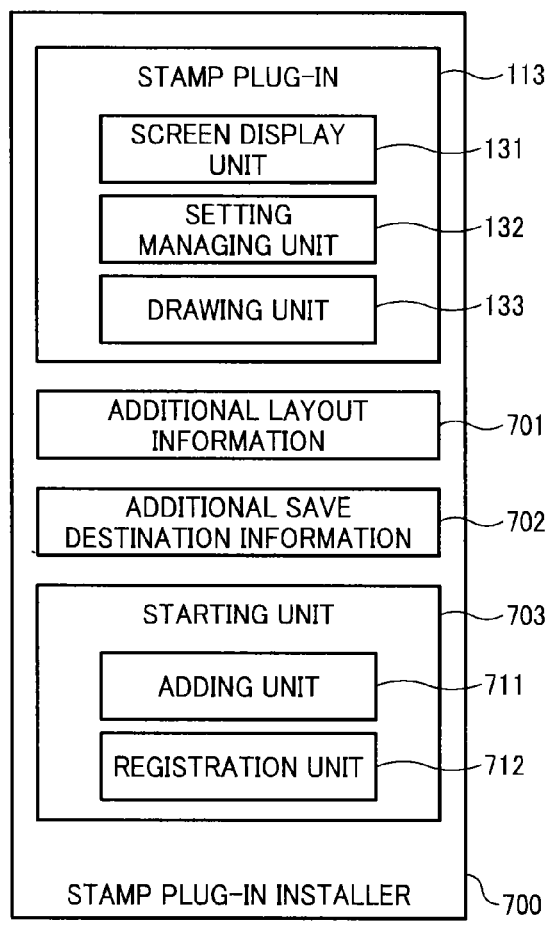
FIG. 7 is a block diagram illustrating the configuration of a stamp plug-in installer.
FIG. 8 is a diagram illustrating an example of additional layout information included in the stamp plug-in installer.

Next, it will be explained about an installer that adds a plug-in. FIG. 7 is a block diagram illustrating the configuration of a stamp plug-in installer 700 that installs the stamp plug-in 113. As illustrated in FIG. 7, the stamp plug-in installer 700 includes the stamp plug-in 113, additional layout information 701, additional save destination information 702, and a starting unit 703. The stamp plug-in 113 has a similar configuration as that of the stamp plug-in 113 illustrated in FIG. 2.

The additional layout information 701 stores information to be added to the layout information of the storage unit 104 to realize the function of the stamp plug-in 113.

FIG. 8 is a diagram illustrating an example of the additional layout information 701. As illustrated in FIG. 8, information for displaying information related to the stamp plug-in 113 on a setting screen is stored.

Returning to FIG. 7, the additional save destination information 702 stores information to be added to the save destination information of the storage unit 104 to realize the function of the stamp plug-in 113.

FIG. 9 is a diagram illustrating an example of the additional save destination information 702. As illustrated in FIG. 9, the save destination of the setting that is used to realize the function of the stamp plug-in 113 is stored.

Returning to FIG. 7, the starting unit 703 includes an adding unit 711 and a registration unit 712, and controls the installation of a plug-in. Specifically, when the stamp plug-in installer 700 is started by a user, the starting unit 703 controls a driver that is the addition target of a plug-in to install the driver in the OS 102 and then adds the stamp plug-in 113 to the printer driver 103.

The adding unit 711 performs a process for adding additional information (additional layout information, additional save destination information, and additional function information) to each setting information (layout information, save destination information, and function information) stored in the storage unit 104.

The registration unit 712 registers a file name indicative of the module of a plug-in to be added in each scope of the plug-in information of the storage unit 104.

In the example described above, it has been explained about the case of the stamp plug-in installer 700. The following is not explained in the example described above. However, information to be added to function information that is setting information may include additional function information and the like.

Moreover, a borderline plug-in installer may be also realized by the substantially similar configuration. In this case, the borderline plug-in installer requires additional layout information, additional save destination information, and additional function information in addition to a borderline plug-in. A point the borderline plug-in installer is different from the stamp plug-in installer 700 is that the borderline plug-in installer includes additional function information.

FIG. 10 is a diagram illustrating an example of the additional function information of the borderline plug-in installer. As illustrated in FIG. 10, a setting for realizing the function of the borderline plug-in 114 is stored.

In the plug-in installer according to the present embodiment, it has been explained about the case where the number of plug-ins to be added is one. However, the number of plug-ins to be added may be two or more.

Figure 11:
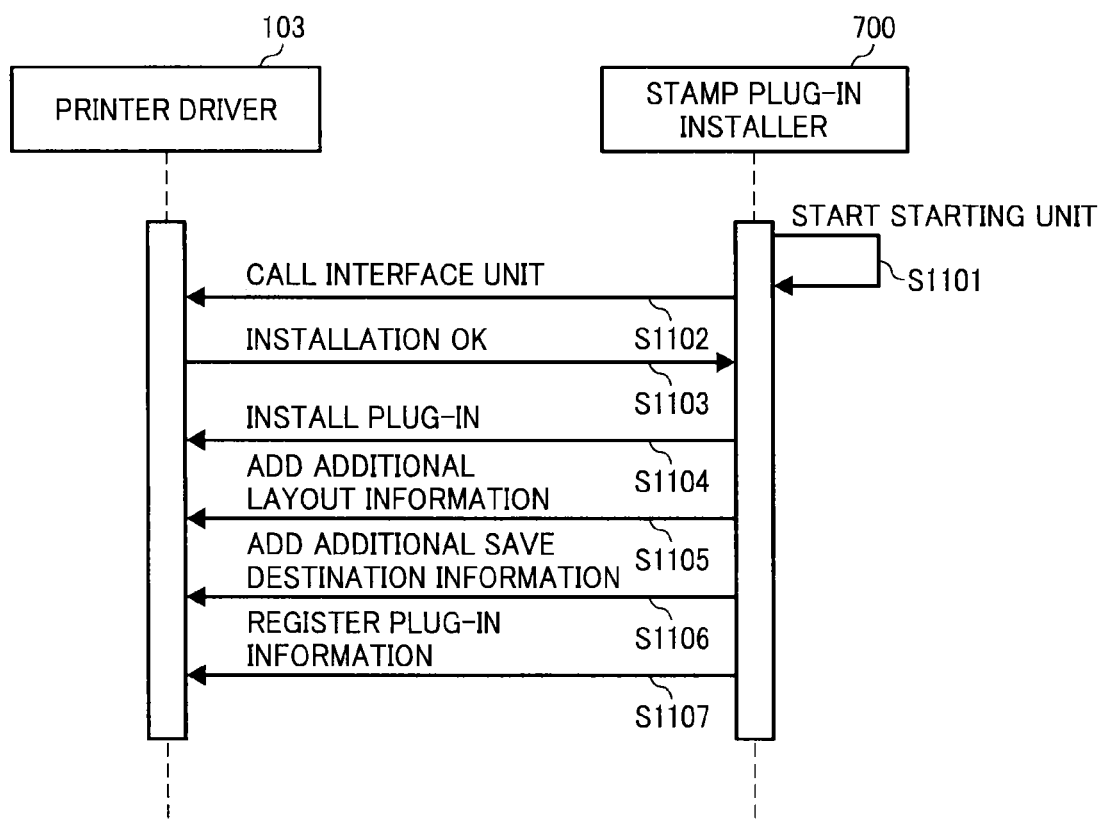
FIG. 11 is a flowchart illustrating the procedure of process for an installation process of a plug-in that uses the stamp plug-in installer in the PC according to the first embodiment.

Next, it will be explained about the installation process of a plug-in that uses the stamp plug-in installer 700 according to the present embodiment. FIG. 11 is a flowchart illustrating the process procedure performed in the stamp plug-in installer 700 in the PC 100 according to the present embodiment.

First, the stamp plug-in installer 700 is executed in response to the operation of the user. In this way, the starting unit 703 starts up (Step S1101).

Next, the starting unit 703 calls out the interface unit 112 of the printer driver 103 (Step S1102). Then, the interface unit 112 outputs a message to the effect that the installation is successful to the stamp plug-in installer 700 (Step S1103).

Then, the stamp plug-in installer 700 installs (copies) a screen display unit 131, a setting managing unit 132, and a drawing unit 133 of a plug-in in an installation directory that saves a driver that is the addition target of the plug-in (Step S1104).

After that, the adding unit 711 of the stamp plug-in installer 700 adds the additional layout information of the stamp plug-in to the layout information to which the core driver 111 of the printer driver 103 refers (Step S1105).

Furthermore, the adding unit 711 adds the additional save destination information of the stamp plug-in to the save destination information to which the core driver 111 of the printer driver 103 refers (Step S1106).

After that, the registration unit 712 registers the file names of the screen display unit, the setting managing unit, and the drawing unit of the stamp plug-in 113 in each scope of the plug-in information to which the core driver 111 of the printer driver 103 refers (Step S1107).

According to the processing procedure described above, the installation of the stamp plug-in 113 is terminated. In addition, the addition of function information is not performed in the processing procedure described above. However, the addition of function information may be performed if required. For example, the addition of function information is performed when the borderline plug-in is installed.

As described above, the present invention is not limited to the addition of plug-in after the installation of the printer driver 103. A plug-in may be added to the package of the printer driver 103 before being installed in the PC 100. Similarly, also in this case, it is assumed that each module of the stamp plug-in 113 is added to a package and an information addition process is performed on the setting information developed after installation.

Returning to FIG. 2, the stamp plug-in 113 includes the screen display unit 131, the setting managing unit 132, and the drawing unit 133, and realizes a stamp function in a print process.

The stamp function of the stamp plug-in 113 is a function for deciding a range in which coordinates may be designated from a paper size. Because a process for deciding a range that can be designated for the stamp function is complicated, it is difficult to describe any information in the function information stored in the storage unit 104. For this reason, the stamp plug-in 113 includes the setting managing unit 132 that performs the process for deciding the range. Moreover, the stamp plug-in 113 makes it display a preview by which the position of a stamp can be visually recognized. However, layout information cannot define the display of the preview. Therefore, the stamp plug-in 113 includes the screen display unit 131 that performs this display. Furthermore, the stamp plug-in 113 includes the drawing unit 133 that prints a stamp.

The screen display unit 131 displays a stamp setting screen. The setting managing unit 132 manages setting used for the process of stamp. The setting managing unit 123 according to the present embodiment manages print setting and solves the settable range of each setting and the prohibition between setting values of the print setting. The drawing unit 133 performs a process for drawing a stamp that is performed on a print target.

The borderline plug-in 114 includes a drawing unit 141 and realizes a borderline function in a print process. Because the installation procedure of the plug-in is substantially similar to that of the stamp plug-in 113, their descriptions are omitted. Moreover, the drawing unit 141 performs a process for drawing a borderline.

The borderline plug-in 114 can select a partition line function when compaction is not off. Because the line boundary character check can be sufficiently described in function information, the borderline plug-in 114 does not have the setting managing unit and corresponds to additionally describing the line boundary character check in function information. Moreover, it is assumed that an item expected to be displayed on a setting screen for the borderline plug-in 114 falls within a range that can be described by layout information. Therefore, the borderline plug-in 114 does not have a screen display unit and additionally describes an item expected to be displayed in the layout information of the storage unit 104. As a result, a setting item related to the borderline plug-in 114 is performed on the screen display unit 121 of the core driver 111. Moreover, the borderline plug-in 114 has the drawing unit 141 that prints a partition line on a logical page.

The stamp plug-in 113 that is added to the printer driver 103 according to the present embodiment requires the screen display unit 131, the setting managing unit 132, and the drawing unit 133. On the contrary, the borderline plug-in 114 can provide a sufficient function by developing only the drawing unit 141. Moreover, the acceptance of setting modification, the line boundary character check, or the like that is a module that does not perform all developments can be realized by adding the description to the configuration file.

Unlike the present embodiment, for example, when adding a plug-in showing a simple preview based on each print setting, the present invention can be realized by developing a plug-in having only a setting display unit. In this way, the present invention can be realized by developing only a module required for each plug-in.

FIG. 12 is a diagram illustrating layout information after adding the stamp plug-in 113 and the borderline plug-in 114. Layout data (display information) for performing the setting of function related to the added plug-in is defined in the layout information illustrated in FIG. 12.

However, in the layout information illustrated in FIG. 12, the description related to the core driver 111 is not modified from that of FIG. 3. The descriptions related to the stamp plug-in 113 and the borderline plug-in 114 are added to the layout information.

The description related to the borderline plug-in 114 shows to add borderline setting in a check-box format. As a result, the screen display unit 121 of the core driver 111 performs the whole of the UI display process of setting related to the borderline. In other words, the borderline plug-in 114 can perform setting on a setting screen even if there is not a screen display unit.

In the description related to the stamp plug-in 113, "PluginDialogButton" that is the value of an attribute "type" is expressed as a UI component indicating a push button that calls the setting screen of the stamp plug-in 113. A plug-in name to be called out is described in the value of the attribute "name". The plug-in name is associated with a plug-in name described in the plug-in information. The screen display unit 121 of the core driver 111 may acquire the file name of the plug-in that should be called out from the plug-in information by using the plug-in name read from the layout information as a key. As a result, the screen display unit 131 of the stamp plug-in 113 may be called out.

FIG. 13 is a diagram illustrating an example of a print setting screen displayed by the screen display unit 131 of the core driver 111 after adding the stamp plug-in 113 and the borderline plug-in 114. In the example of the print setting screen illustrated in FIG. 13, unlike the print setting screen of FIG. 4, a check box 1301 of saddle stitch setting located at an upper right, and a push button 1302 that calls out the setting screen of the stamp plug-in 113, located at a lower right, are added.

Next, it will be explained about a display screen when the push button 1302 is clicked. FIG. 14 is a diagram illustrating an example of the setting screen of the stamp plug-in 113 displayed by the screen display unit 131 of the stamp plug-in 113.

In the example of the setting screen of the stamp plug-in 113 illustrated in FIG. 14, a check box 1401 that is located at the left of the screen decides the ON/OFF of the stamp function. "Stamp Image" that is located at the left of the screen can select an image to be stamped. For example, in the example illustrated in FIG. 14, because "Sample" is designated, a character string "Sample" is printed on recording paper. "Axis X" that is located at the right of the screen designates horizontal-direction coordinates at which a stamp function is printed. "Axis Y" designates vertical-direction coordinates at which a stamp function is printed.

FIG. 15 is a diagram illustrating save destination information after adding the stamp plug-in 113 and the borderline plug-in 114. In the save destination information illustrated in FIG. 15, the description related to the core driver 111 is not modified from that of FIG. 6. The descriptions related to the stamp plug-in 113 and the borderline plug-in 114 are added to the save destination information.

The description related to the borderline plug-in 114 designates that the set value of ON/OFF of a partition line called a borderline is saved in a "Devmode" structure.

The description related to the stamp plug-in 113 designates that the set value of ON/OFF of the stamp function is saved in "Devmode" as the setting name "stamp". The description designates that the value indicative of the type of stamp is saved in "Devmode" as the setting name "stamp_image". The description designates that the set value of horizontal-direction coordinates printed as the stamp function is saved in "Devmode" as the setting name "stamp_axis_x". The description designates that the set value of vertical-direction coordinates printed as the stamp function is saved in "Devmode" as the setting name "stamp_axis_y".

FIG. 16 is a diagram illustrating function information after adding the stamp plug-in 113 and the borderline plug-in 114. A set value that is used for a function performed by the added plug-in is defined in the function information illustrated in FIG. 16.

However, in the function information illustrated in FIG. 16, the description related to the core driver 111 is not modified from that of FIG. 5. The description related to the borderline plug-in 114 is added compared with the function information described in FIG. 5.

The borderline setting illustrated in the function information of FIG. 16 is the setting of the ON/OFF function of a partition line. When there is not compaction, the function of the borderline forcibly becomes "OFF". For the rest, it is described that the ON/OFF of the function is selectable. On the basis of function information, because the setting managing unit 123 of the core driver 111 manages the setting of the borderline, the borderline plug-in 114 does not require the setting managing unit 123.

The "stamp", "stamp_image", "stamp_axis_x", and "stamp_axis_y" that are the settings of the stamp plug-in 113 are managed by the setting managing unit 132 of the stamp plug-in 113. For this reason, the description performed by the stamp plug-in 113 is not in the function information.

As described above, it is preferable that each plug-in includes a module (a screen display unit, a setting managing unit, and a drawing unit) if required. If not required, it is preferable that each plug-in calls out the module (the screen display unit 121, the setting managing unit 123, and the drawing unit 124) of the core driver 111. As a result, a development burden may be reduced because the creation of an unnecessary module is omitted.

FIG. 17 is a diagram illustrating plug-in information after adding the stamp plug-in 113 and the borderline plug-in 114. The plug-in information can utilize any format. In the present embodiment, the plug-in information utilizes an "ini" format.

The plug-in information illustrated in FIG. 17 has three scopes of "ui_plugin", "setting_manager_plugin", and "graphic_plugin".

The "ui_plugin" holds the name of each plug-in and the file name of the screen display unit in association with each other. The screen display unit of each plug-in may be called out from the screen display unit 121 of the core driver 111 or the like by using the file name of each plug-in described in "ui_plugin". In other words, the screen display unit of the plug-in is called out by only the screen display unit of the core driver.

The "setting_manager_plugin" holds the title of each plug-in and the file name of the setting managing unit of each plug-in in association with each other. The setting managing unit of each plug-in may be called out from the setting managing unit 123 of the core driver 111 or the like by designating the file name of each plug-in described in "setting_manager_plugin". In other words, the setting managing unit of the plug-in is called out by only the setting managing unit of the core driver.

The "graphic_plugin" holds the title of each plug-in and the file name of the drawing unit of each plug-in in association with each other. The drawing unit of each plug-in can be called from the drawing unit 124 of the core driver 111 or the like by designating the file name of each plug-in described in "graphic_plugin". In other words, the drawing unit of the plug-in is called by only the drawing unit of the core driver.

In the example illustrated in FIG. 17, because the borderline plug-in 114 has only the drawing unit 141, only the "graphic_plugin" has the description.

In the example of the plug-in information illustrated in FIG. 17, the same dynamic link library is designated for each module of the stamp plug-in 113. However, separate dynamic link libraries may be designated.

In other words, the module group illustrated by the screen display unit 121, the setting saving unit 122, the setting managing unit 123, and the drawing unit 124 carries out, on behalf of modules constituting the plug-in, a process that is necessary for a predetermined function to be performed by a plug-in and that cannot be performed by the modules constituting the plug-in, in accordance with setting information (layout information, save destination information, function information, and plug-in information).

Then, the setting information stored in the storage unit 104 is written by the installer of the plug-in. The screen display unit 121, the setting saving unit 122, the setting managing unit 123, and the drawing unit 124 refer to the written setting information to carry out the process on behalf of the modules constituting the plug-in.

Figure 18:
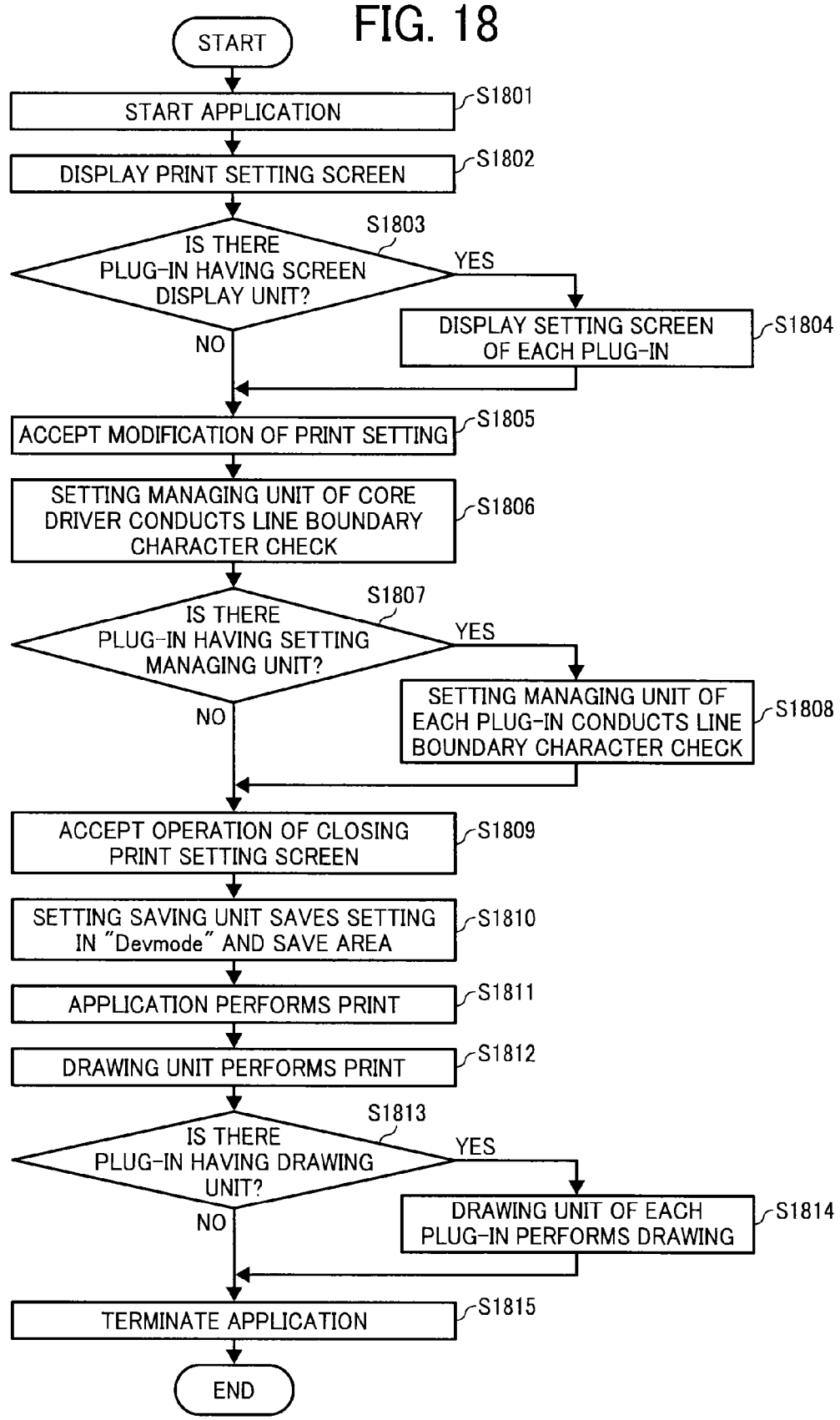
FIG. 18 is a flowchart illustrating the procedure of an overall print process performed in the PC according to the first embodiment.

Next, it will be explained about an overall print process in the PC 100 according to the present embodiment that is configured as described above. FIG. 18 is a flowchart illustrating the process procedure performed in the PC 100 according to the present embodiment.

First, the PC 100 starts up the application 101 (Step S1801). Then, the screen display unit 121 of the core driver displays a print setting screen in response to the request of the application 101 (Step S1802).

Next, the screen display unit 121 refers to the plug-in information and determines whether there is a plug-in having a screen display unit (Step S1803). When it is determined that a plug-in having a screen display unit is not present (Step S1803: No), the process procedure advances to Step S1805.

On the other hand, when it is determined that a plug-in having a screen display unit is present (Step S1803: Yes), the screen display unit of each plug-in displays a setting screen (Step S1804). After that, the process procedure advances to Step S1805.

Then, the printer driver 103 accepts the modification of print setting from the setting screen displayed in Step S1802 and Step S1804 (Step S1805).

Next, the setting managing unit 123 of the core driver 111 performs the line boundary character check on the accepted print setting (Step S1806).

After that, the setting managing unit 123 of the core driver 111 refers to plug-in information and determines whether a plug-in having a setting managing unit is present (Step S1807). When it is determined that a plug-in having a setting managing unit is not present (Step S1807: No), the process procedure advances to Step S1809.

When it is determined that a plug-in having a setting managing unit is present (Step S1807: Yes), the setting managing unit of each plug-in performs the line boundary character check (Step S1808).

After that, the printer driver 103 accepts an operation for closing the print setting screen from the user (Step S1809).

Next, the setting saving unit 122 saves the modification result of print setting in "Devmode" or a save area (Step S1810).

Then, the application 101 performs a print (Step S1811).

Then, the drawing unit 124 of the core driver 111 of the printer driver 103 executes a print process (Step S1812). After that, the drawing unit 124 refers to plug-in information and determines whether a plug-in having a drawing unit is present (Step S1813). When it is determined that a plug-in having a drawing unit is not present (Step S1813: No), the process procedure advances to Step S1815.

On the other hand, when it is determined that the drawing unit 124 is present (Step S1813: Yes), the drawing unit of each plug-in executes a drawing process related to print (Step S1814).

Finally, the application 101 is terminated (Step S1815) to terminate the process.

Because the processes of each module of the core driver 111 and each module of the plug-in are executed in accordance with the processing procedure described above, a print process with the function of plug-in can be performed. Hereinafter, it will be explained about the detailed procedure of each step.

Figure 19:
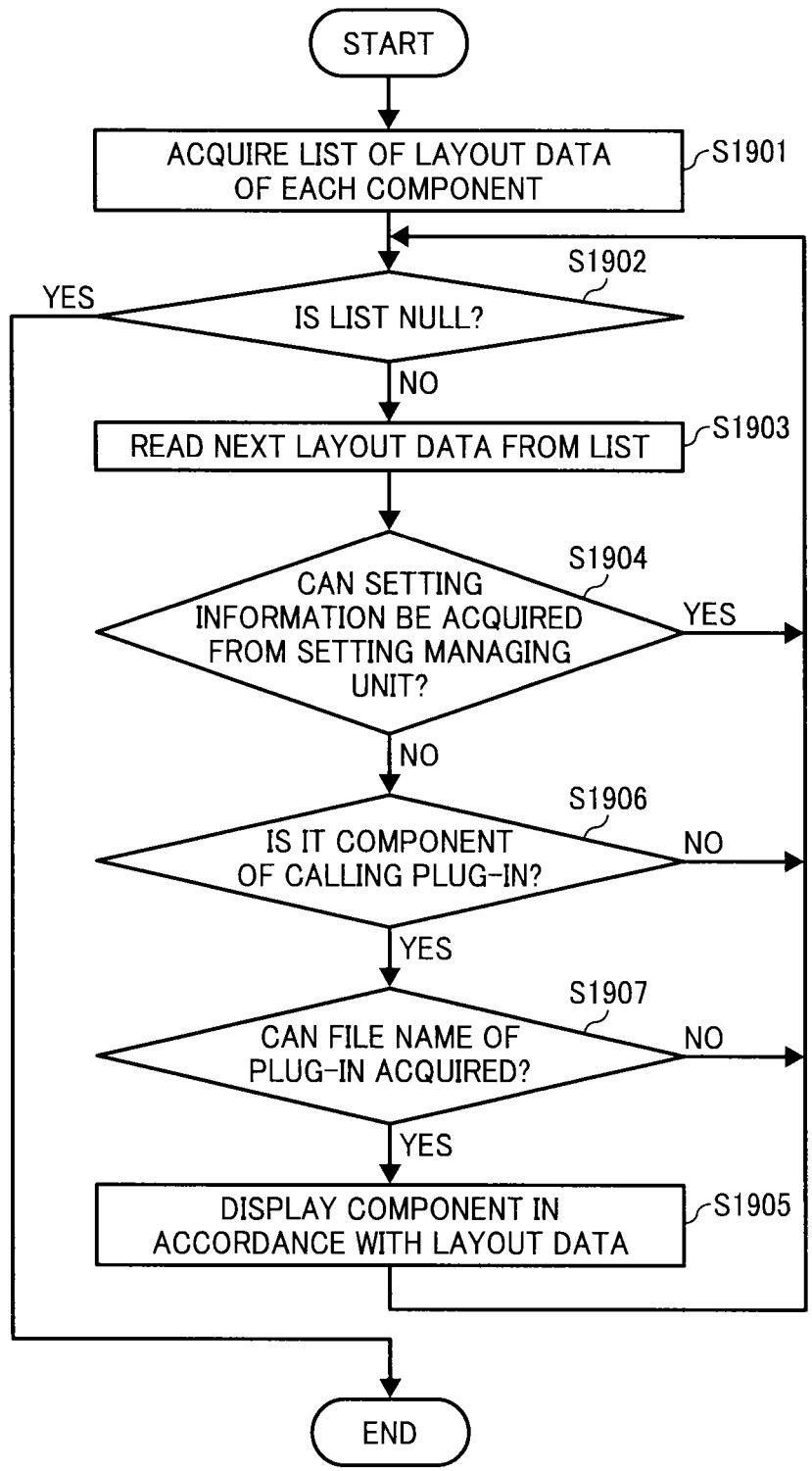
FIG. 19 is a flowchart illustrating the display process procedure of a setting screen performed in a printer driver according to the first embodiment.

Next, it will be explained about the display process of the setting screen performed in the printer driver 103 according to the present embodiment, which is shown in Step S1802 of FIG. 18. FIG. 19 is a flowchart illustrating the process procedure performed in the printer driver 103 according to the present embodiment.

First, the screen display unit 121 of the core driver 111 refers to layout information and acquires the list of layout data of each component (Step S1901).

Next, the screen display unit 121 determines whether the list of layout data is null (Step S1902). When it is determined that the list is not null (Step S1902: No), the screen display unit 121 reads one layout data from the list (Step S1903).

Then, the screen display unit 121 acquires setting information such as a set value, whether it is in accordance with prohibition condition, or an alternative, from the setting managing unit 123 on the basis of the setting name designated by "name" of layout data.

After that, the screen display unit 121 determines whether the setting information is acquired from the setting managing unit 123 (Step S1904). When it is determined that the setting information is acquired (Step S1904: Yes), the display is performed in accordance with the layout data and the setting information (Step S1905).

On the other hand, when it is determined that the setting information is not acquired (Step S1904: No), the screen display unit 121 determines whether it is a component that calls out a plug-in like "PluginDialogButton" (Step S1906). When it is determined that it is not the component (Step S1906: No), the process procedure advances to Step S1902.

Then, when it is determined that it is the component (Step S1906: Yes), the screen display unit 121 acquires the file name of the plug-in from the plug-in information.

After that, the screen display unit 121 determines whether the file name of the plug-in is acquired from the plug-in information (Step S1907). When it is determined that the file name of the plug-in is acquired (Step S1907: No), the screen display unit 121 starts the process with Step S1902.

Moreover, when it is determined that the file name of the plug-in is acquired from the plug-in information (Step S1907: Yes), the screen display unit 121 displays a component in accordance with the layout data and the setting information (Step S1905).

Then, at Step S1902, when it is determined that the list is null (Step S1902: Yes), the process is terminated.

In accordance with the processing procedure described above, the setting and the component of plug-in supported by the printer driver 103 are displayed on the setting screen.

About a component that does not perform the call out of plug-in, when the setting information corresponding to the component is not managed by the setting managing unit 123 of the core driver 111 or the setting managing unit of the plug-in, the screen display unit 121 determines that the printer driver 103 does not support the setting information and does not perform the display.

Moreover, concerning a component that performs the call out of plug-in when displaying the setting screen, the screen display unit 121 displays the component only when the plug-in is described in the plug-in information and does not display the component when the plug-in is not described in the plug-in information.

Figure 20:
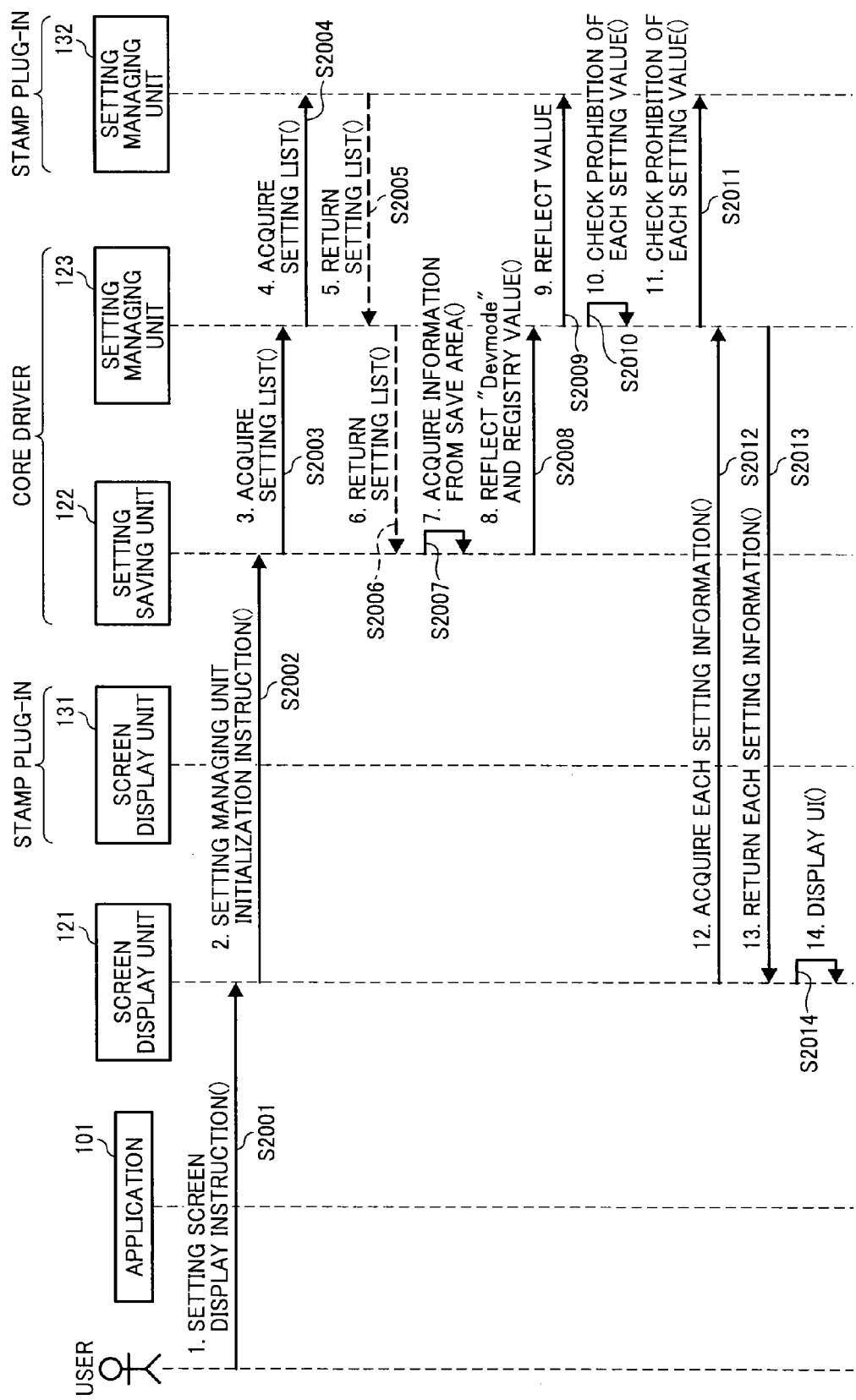
FIG. 20 is a sequence diagram illustrating the process procedure between modules when the printer driver according to the first embodiment displays the setting screen.

Next, it will be explained about the process between modules when the printer driver 103 according to the present embodiment displays the setting screen. FIG. 20 is a sequence diagram illustrating the process procedure performed in the printer driver 103 according to the present embodiment. The sequence diagram is a sequence that in detail illustrates Step S1802 of FIG. 18.

First, the screen display unit 121 accepts an instruction for displaying a setting screen from the user (Step S2001).

Next, the screen display unit 121 transfers "Devmode" to the setting saving unit 122 and requests the initialization of the setting managing unit (Step S2002).

Then, the setting saving unit 122 commands the setting managing unit 123 to acquire the list of setting (Step S2003). Then, the setting managing unit 123 refers to plug-in information and commands the setting managing unit 132 of the specified stamp plug-in 113 to acquire the list of setting (Step S2004).

Along with the above, the setting managing unit 132 of the stamp plug-in 113 returns the list of setting managed by the stamp plug-in 113 to the setting managing unit 123 (Step S2005).

Next, the setting managing unit 123 adds the list of setting of the stamp plug-in 113 to the list of setting managed for the core driver 111 and returns the added list to the setting saving unit 122 (Step S2006).

Then, the setting saving unit 122 acquires a set value corresponding to the setting stored in the list from an area such as the storage unit 104 in which the set value is saved (Step S2007).

Next, the setting saving unit 122 commands the setting managing unit 123 to reflect the value of "Devmode" and the set value acquired from the saved area on each setting of the setting list received in Step S2006 (Step S2008).

Then, the setting managing unit 123 makes the setting managing unit 132 reflect a set value corresponding to the setting managed in the stamp plug-in 113 (Step S2009).

Next, the setting managing unit 123 performs the line boundary character check on the set value of each setting managed by the core driver 111 (Step S2010).

Next, the setting managing unit 123 performs the line boundary character check on each setting managed by the setting managing unit 132 of the stamp plug-in 113 (Step S2011).

After that, the screen display unit 121 performs the acquisition request of information of each setting described in the layout information (Step S2012). It is assumed that the information of setting is the set value of setting, a prohibition, an alternative, and the like.

Furthermore, the setting managing unit 132 returns the setting information that is requested (Step S2013). After that, the screen display unit 121 displays a setting screen by using the received each setting information and the layout information (Step S2014).

The setting screen may be displayed in accordance with the processing procedure described above.

Figure 21:
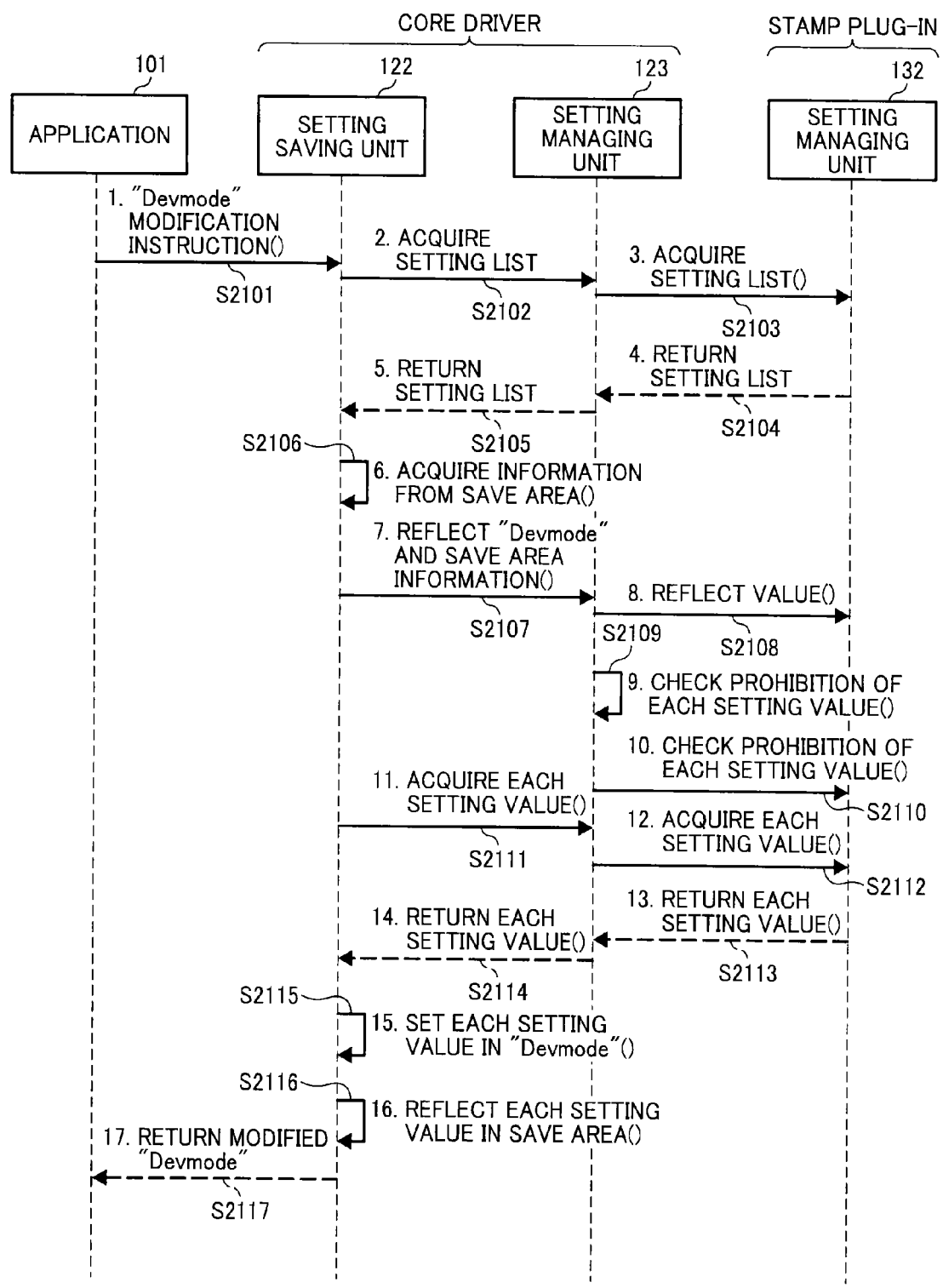
FIG. 21 is a sequence diagram illustrating the process procedure between modules when performing operations required by the printer driver according to the first embodiment.

Next, it will be explained about a process between modules when performing an operation required by the printer driver 103 according to the present embodiment. FIG. 21 is a sequence diagram illustrating the process procedure performed in the printer driver 103 according to the present embodiment.

In an example illustrated in FIG. 21, the sequence diagram illustrates the sequence in the case where the stamp plug-in 113 and the borderline plug-in 114 are already added to the printer driver 103 and the modification instruction of "Devmode" is accepted from the application.

First, the application 101 commands the setting saving unit to perform the modification of "Devmode" (Step S2101). Next, the setting saving unit 122 commands the setting managing unit 123 to acquire the list of setting (Step S2102).

After that, the setting managing unit 123 commands the setting managing unit 132 of the stamp plug-in 113 to acquire the list of setting (Step S2103).

Next, the setting managing unit 132 returns the list of setting managed for the stamp plug-in 113 to the setting managing unit 123 (Step S2104). After that, the setting managing unit 123 adds the setting list of the stamp plug-in 113 to the list of setting managed by the setting managing unit 123 and returns the added list to the setting saving unit 122 (Step S2105).

Then, the setting saving unit 122 acquires a set value from a save area such as the storage unit 104 (Step S2106).

Next, the setting saving unit 122 commands the setting managing unit 123 to reflect the value of "Devmode" and the set value saved in the save area on each setting of the setting list received in Step S2105 (Step S2107).

Then, the setting managing unit 123 commands the setting managing unit 132 of the stamp plug-in 113 to reflect the set value input in Step S2107 on the setting (each setting name of the list received in Step S2104) managed in the stamp plug-in 113 (Step S2108).

Next, the setting managing unit 123 performs the line boundary character check on each setting managed by the setting managing unit 123 itself (Step S2109). After that, the setting managing unit 123 performs the line boundary character check on each setting that is managed by the setting managing unit 132 of the stamp plug-in 113 (Step S2110).

Next, the setting saving unit 122 commands the setting managing unit 123 to acquire the set value of each of the setting (Step S2111). Along with the above, the setting managing unit 123 performs the acquisition request of the set value of each setting managed by the setting managing unit 132 of the stamp plug-in 113 (Step S2112).

Then, the setting managing unit 132 of the stamp plug-in 113 returns the set value of each setting managed therein to the setting managing unit 123 (Step S2113). After that, the setting managing unit 123 returns the set value of each setting managed thereby and the set value of each setting input from the setting managing unit 132 of the stamp plug-in 113 to the setting saving unit 122 (Step S2114).

Then, the setting saving unit 122 saves, in "Devmode", only the set value of the setting designated by "Devmode" as save destination information among set values of each the input setting (Step S2115). After that, the setting saving unit 122 saves, in the save area, only the set value of setting designated in the save area (for example, registry) as save destination information among set values of each the input setting (Step S2116). After that, the setting saving unit 122 returns a "Devmode" structure in which a set value and the like are saved (Step S2117).

In accordance with the processing procedure described above, a set value required for a print process can be set for a "Devmode" structure and a save area.

Moreover, in the processing procedure described above, because the setting saving unit 122 of the core driver exchanges the data of the setting managing unit of the plug-in only through the setting managing unit 123 of the core driver, an operation can be performed as if the setting managing unit of the plug-in is present only by increasing the description of function information.

Figure 22:
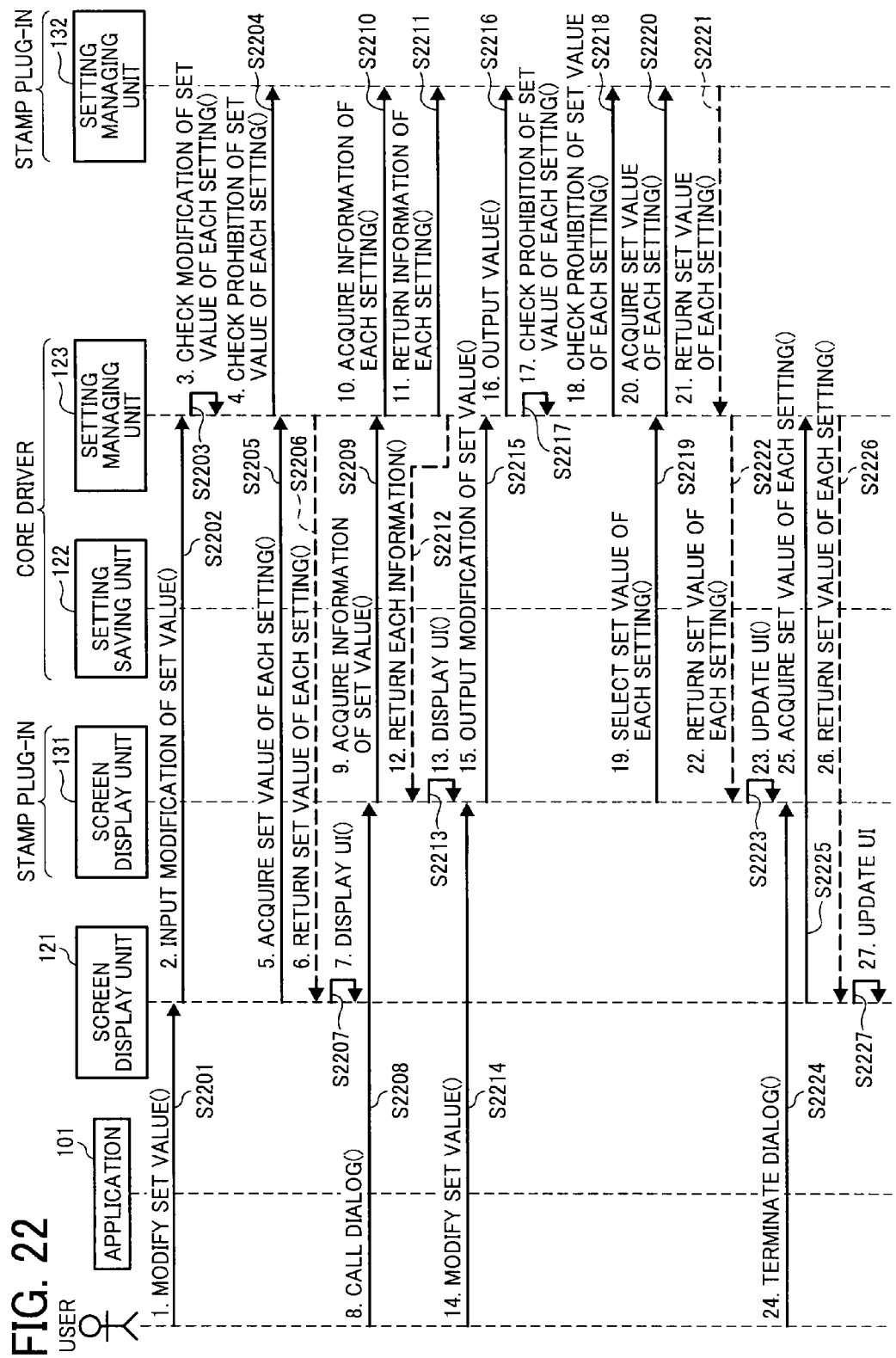

Next, it will be explained about a process when accepting the modification of setting from the user on a setting display screen. FIG. 22 is a sequence diagram illustrating a process performed in the printer driver 103 in accordance with the set value input in the displayed setting screen when the stamp plug-in 113 and the borderline plug-in 114 are added. This process corresponds to the processes of Steps S1804 to S1808 of FIG. 18.

First, the screen display unit 121 accepts the modification of the set value displayed in the setting screen from the user (Step S2201). Next, the screen display unit 121 outputs the modified set value to the setting managing unit 123 (Step S2202). Next, the setting managing unit 123 sets the input set value and then performs the line boundary character check of the set value of each setting that is managed thereby (Step S2203).

After that, the setting managing unit 123 performs the line boundary character check of the set value of each setting that is managed by the setting managing unit 132 of the stamp plug-in 113 (Step S2204).

After that, the screen display unit 121 acquires the set value of each setting described in the layout information (Step S2205). Then, the setting managing unit 123 returns the set value of each the requested setting (Step S2206).

Then, the screen display unit 121 updates the setting screen in accordance with the set value of each the received setting (Step S2207).

Next, it is assumed that the user calls out the dialog of the stamp plug-in 113 from the displayed setting screen. In this case, the call out of the dialog by the user is made toward the screen display unit 131 of the stamp plug-in 113 (Step S2208).

Then, the screen display unit 131 of the stamp plug-in 113 requests the setting managing unit 123 of the core driver 111 to acquire the set value of each setting displayed on the setting screen of the stamp plug-in 113 (Step S2209).

Then, the setting managing unit 123 makes the setting managing unit 132 of the stamp plug-in 113 acquire the set value of each the requested setting (Step S2210).

Along with the above, the setting managing unit 132 of the stamp plug-in 113 returns the set value of each setting in response to the acquisition request (Step S2211). Furthermore, the setting managing unit 123 returns the set value of each setting received from the setting managing unit 132 of the stamp plug-in 113 (Step S2212).

Then, the screen display unit 131 of the stamp plug-in 113 displays the setting screen of the stamp plug-in 113 in accordance with the set value of each the received setting (Step S2213).

Next, the screen display unit 131 of the stamp plug-in 113 accepts the modification of the set value of each setting for the displayed setting screen in accordance with the operation performed by the user (Step S2214).

Then, the screen display unit 131 outputs the set value of each the accepted setting to the setting managing unit 123 (Step S2215). The setting managing unit 123 determines that the set value of the input setting is the set value of setting that is managed by the setting managing unit 132 of the stamp plug-in 113 and outputs the set value of the input setting to the setting managing unit 132 of the stamp plug-in 113 (Step S2216).

After that, the setting managing unit 123 of the core driver 111 performs the line boundary character check of the set value of each the managed setting (Step S2217). Furthermore, the setting managing unit 123 of the core driver 111 performs the line boundary character check of the set value of each setting that is managed by the setting managing unit 132 of the stamp plug-in 113 (Step S2218).

After that, the screen display unit 131 of the stamp plug-in 113 requests the setting managing unit 123 to acquire the set value of each the displayed setting (Step S2219).

Then, the setting managing unit 123 makes the setting managing unit 132 of the stamp plug-in 113 acquire the set value of each the requested setting (Step S2220).

Then, the setting managing unit 132 of the stamp plug-in 113 returns the set value of each the requested setting (Step S2221). After that, the setting managing unit 123 returns the set value of each the requested setting (Step S2222).

Then, the screen display unit 131 of the stamp plug-in 113 updates the setting screen of the stamp plug-in 113 from the set value of each the received setting and displays the updated setting screen (Step S2223).

Then, the screen display unit 131 of the stamp plug-in 113 stops displaying the setting screen when accepting an operation for closing the setting screen from the user (Step S2224).

Then, the screen display unit 121 of the core driver 111 makes the setting managing unit 123 of the core driver 111 acquire the set value of each setting (Step S2225). Then, the setting managing unit 123 of the core driver 111 returns the set value of each setting (Step S2226).

After that, the screen display unit 121 performs the updating of the setting screen (UI) (Step S2227).

In the printer driver 103 according to the present embodiment, an item related to the borderline plug-in 114 is included in the setting screen displayed by the screen display unit 121 of the core driver 111. In other words, the core driver 111 can display the description related to the plug-in added to the layout information. Then, even if the plug-in does not include a setting display unit, a means for modifying the setting of the plug-in can be provided to the user.

The setting saving unit 122 of the core driver 111, the screen display unit 121 of the core driver 111, and the setting display unit of the plug-in exchange the set value of each setting with the setting managing unit of the plug-in only through the setting managing unit 123 of the core driver. In other words, because the setting managing unit of the plug-in becomes a common interface that exchanges the set value of each setting, an operation can be performed as if the setting managing unit of the plug-in is present only by increasing the description of function information.

Figure 23:
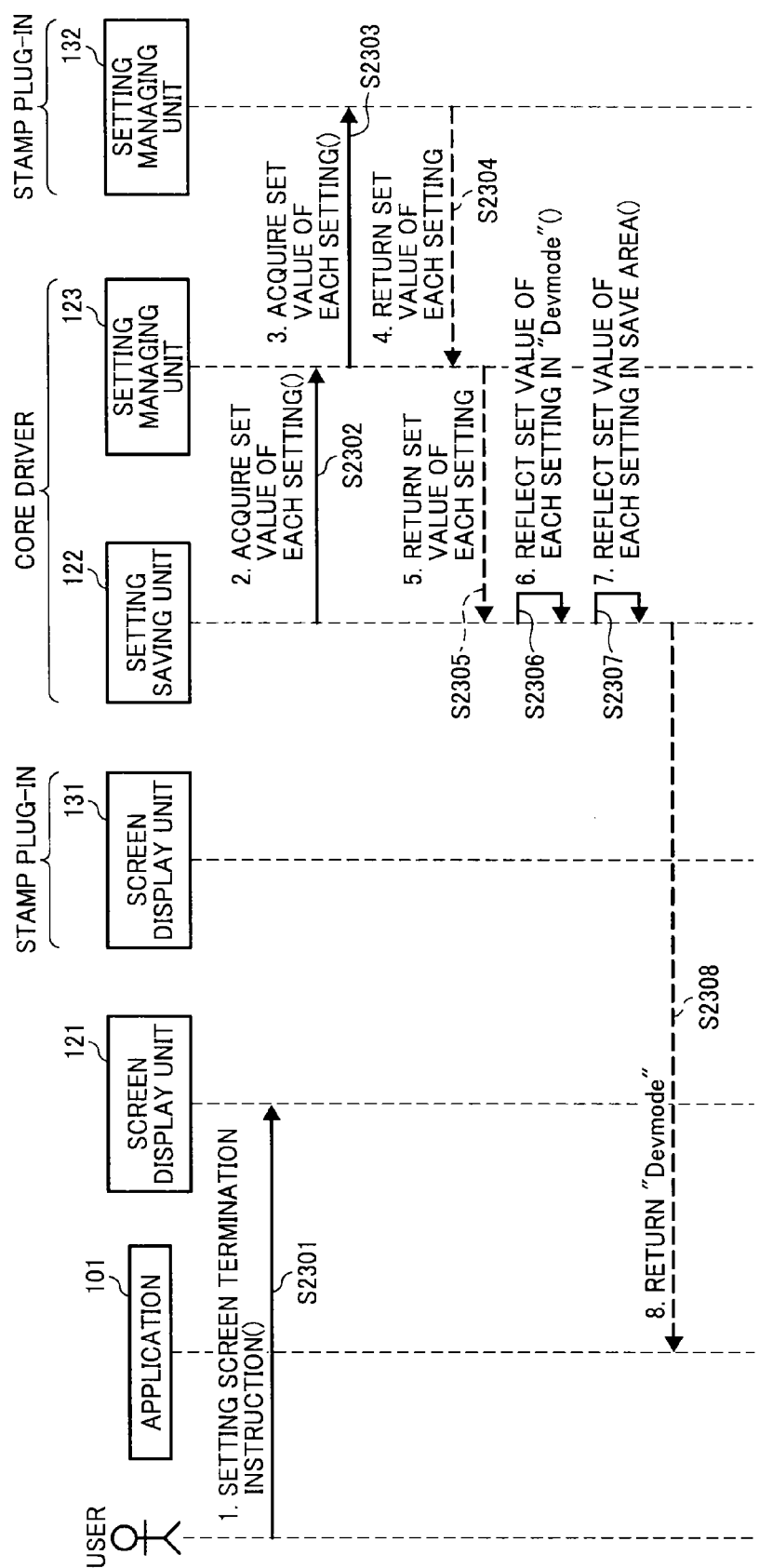

Next, it will be explained about a process when the setting screen is terminated. FIG. 23 is a sequence diagram illustrating a termination process of the setting screen when adding the stamp plug-in 113 and the borderline plug-in 114. This process corresponds to the process of Step S1809 of FIG. 18.

First, the screen display unit 121 accepts the termination request of the setting screen from the user (Step S2301).

In response to the termination request, the setting saving unit 122 makes the setting managing unit 123 acquire the set value of each setting (Step S2302). Then, the setting managing unit 123 requests the acquisition of the set value of each setting managed by the setting managing unit 132 of the stamp plug-in 113 (Step S2303).

Then, the setting managing unit 132 of the stamp plug-in 113 returns the set value of each setting managed thereby to the setting managing unit 123 (Step S2304). Then, the setting managing unit 123 returns the set value of each setting that is managed thereby and the set value of each setting that is managed by the setting managing unit 132 of the stamp plug-in 113 to the setting saving unit 122 (Step S2305).

Then, the setting saving unit 122 saves, in "Devmode", only the set value of setting of which the save destination is designated in "Devmode" as save destination information among the set values of each setting (Step S2306).

After that, the setting saving unit 122 saves, in a save area, only the set value of setting of which the save destination is designated in the save area as save destination information among the set values of each setting (Step S2307). Then, the setting saving unit 122 returns "Devmode" (Step S2308).

In the processing procedure described above, the setting saving unit 122 of the core driver 111 may receive the set value including the set value included in the plug-in through the setting managing unit 123 of the core driver. As a result, an operation can be performed as if the setting managing unit of the plug-in is present only by adding the description to function information.

Figure 24:
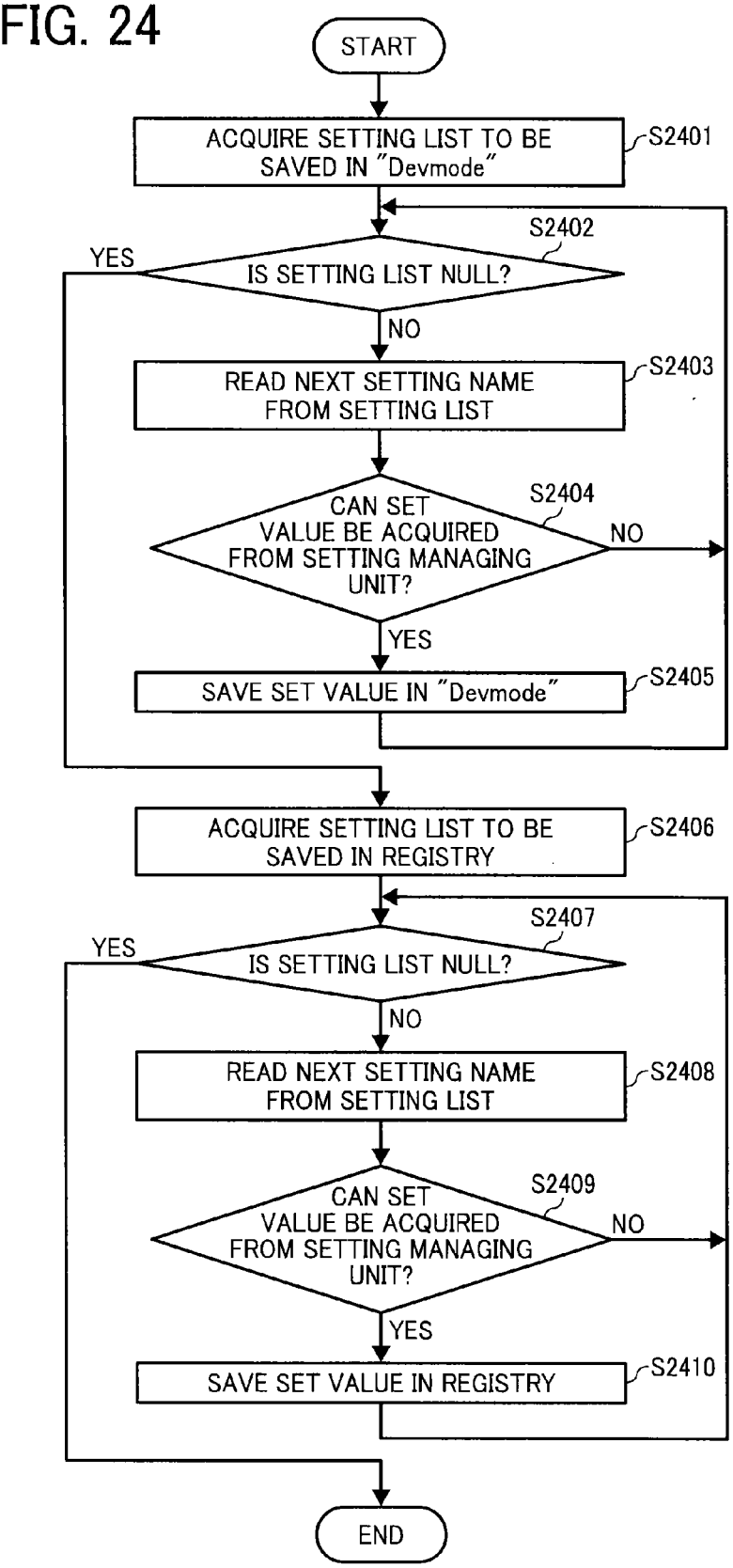
FIG. 24 is a flowchart illustrating a process procedure when saving a set value in a setting saving unit according to the first embodiment.

Next, it will be explained about a process when the setting saving unit 122 of the core driver 111 according to the present embodiment saves the set value. FIG. 24 is a flowchart illustrating the process procedure performed in the setting saving unit 122 according to the present embodiment.

First, the setting saving unit 122 acquires the setting list inside the "Devmode" key from the save destination information stored in the storage unit 104 (Step S2401). In the example illustrated in FIG. 6, "layout", "booklet", "copies", and "papersize" are acquired as the setting list. These settings are setting that should be saved in "Devmode".

Then, the setting saving unit 122 determines whether the setting list is null (Step S2402). When it is determined that the setting list is null (Step S2402: Yes), the process procedure advances to Step S2406.

On the other hand, when it is determined that the setting list is not null (Step S2402: No), the setting saving unit 122 reads the next setting name from the setting list (Step S2403). The read-in of the setting name is performed in order of "layout", "booklet", "copies", and "papersize" in the example illustrated in FIG. 6.

Next, the setting saving unit 122 performs an acquisition request on the setting managing unit 123 and determines whether a set value corresponding to the setting name is acquired (Step S2404). When the set value corresponding to the setting name in not acquired (Step S2404: No), the process is again started with Step S2402.

On the other hand, when it is determined that the set value corresponding to the setting name is acquired (Step S2404: Yes), the setting saving unit 122 saves the acquired set value in a "Devmode" structure (Step S2405). After that, the process is again started with Step S2402.

Then, after the setting list related to "Devmode" is null, the setting saving unit 122 acquires the setting list inside a "registry" key from the save destination information stored in the storage unit 104 (Step S2406). In the example illustrated in FIG. 6, the setting saving unit 122 acquires "userid" as the setting list. These settings are setting that should be saved in a registry.

Then, the setting saving unit 122 determines whether the setting list related to the registry is null (Step S2407). When it is determined that the setting list is not null (Step S2407: No), the next setting name is read from the setting list (Step S2408). The read-in of the setting name is performed in order of "userid" in the example illustrated in FIG. 6.

Next, the setting saving unit 122 performs an acquisition request on the setting managing unit 123 and determines whether the set value corresponding to the setting name is acquired (Step S2409). When the set value corresponding to the setting name is not acquired (Step S2409: No), the process is again started with Step S2407.

On the other hand, when it is determined that the set value corresponding to the setting name is acquired (Step S2409: Yes), the setting saving unit 122 saves the acquired set value in the registry (Step S2410). After that, the process is again started with Step S2407.

On the other hand, when it is determined that the setting list is null at Step S2407 (Step S2407: Yes), the process is terminated.

In accordance with the process described above, the setting required by the printer driver 103 to perform a process is saved for the "Devmode" structure and the registry. Moreover, even when the plug-in is added, the setting required for the process performed by each plug-in can be performed by performing the process described above in accordance with the save destination information illustrated in FIG. 16.

Figure 25:
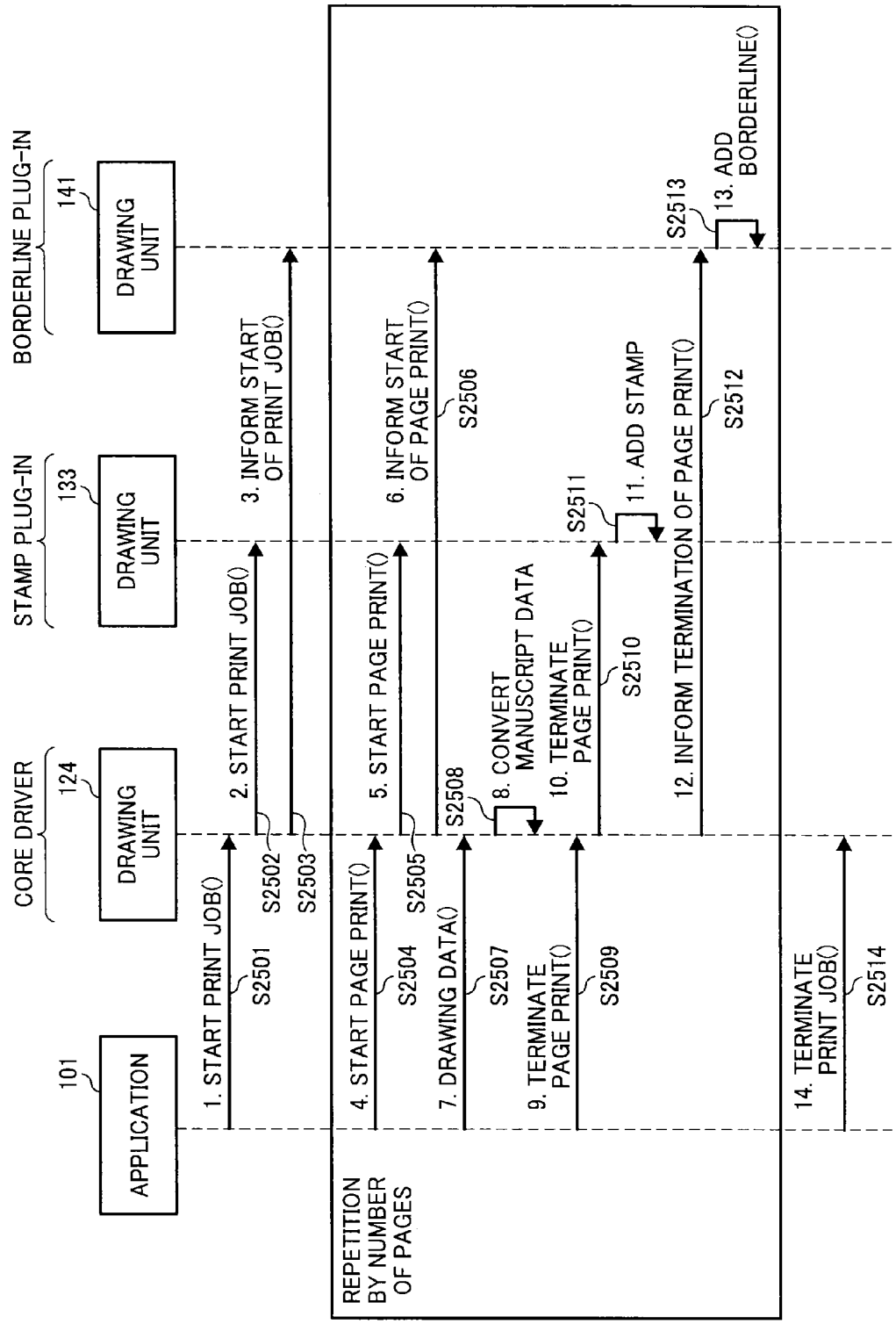

Next, it will be explained about a print process. FIG. 25 is a sequence diagram illustrating a process for performing a print from the application when the stamp plug-in 113 and the borderline plug-in 114 are added. This process corresponds to the processes of Steps S1811 to S1814 of FIG. 18.

First, the application 101 commands the drawing unit 124 of the core driver ill to start a print job (Step S2501).

Next, the drawing unit 124 of the core driver 111 gives notice to the drawing unit 133 of the stamp plug-in 113 of the start of the print job (Step S2502). In response to the notice, the stamp plug-in 113 does not particularly perform a process.

Then, the drawing unit 124 of the core driver 111 gives notice to the drawing unit 141 of the borderline plug-in 114 of the start of the print job (Step S2503). In response to the notice, the borderline plug-in 114 does not particularly perform a process.

After that, the application 101 commands the drawing unit 124 of the core driver 111 to start a page print (Step S2504).

Then, the drawing unit 124 of the core driver 111 commands the drawing unit 133 of the stamp plug-in 113 to start the page print (Step S2505). In response to the notice, the stamp plug-in 113 does not particularly perform a process.

After that, the drawing unit 124 of the core driver 111 commands the drawing unit 141 of the borderline plug-in 114 to start the page print (Step S2506). In response to the notice, the borderline plug-in 114 does not particularly perform a process.

Then, the application 101 sends the drawing data to the drawing unit 124 of the core driver 111 (Step S2507). After that, the drawing unit 124 converts the drawing data into manuscript data that can be interpreted by a printer (Step S2508).

Then, the application 101 commands the drawing unit 124 of the core driver 111 to terminate the print (Step S2509).

Then, the drawing unit 124 of the core driver 111 commands the drawing unit 133 of the stamp plug-in 113 to terminate the page print (Step S2510). At this time, if the function of the stamp plug-in 113 is ON, the drawing unit 133 of the stamp plug-in 113 adds a stamp to the manuscript data (Step S2511). In the present processing procedure, it is assumed that the function of the stamp plug-in 113 is ON.

After that, the drawing unit 124 of the core driver 111 commands the drawing unit 141 of the borderline plug-in 114 to terminate the print of page (Step S2512). At this time, if the function of the borderline plug-in 114 is ON, the drawing unit 141 of the borderline plug-in 114 adds a borderline to manuscript data (Step S2513).

The processes of Steps S2504 to S2513 described above are repeated by the number of pages. Then, the application 101 commands the drawing unit 124 of the core driver 111 to terminate a print job (Step S2514).

As indicated in the processing procedure described above, at the time of print process, each drawing unit of the plug-in performs a process if needed when accepting the notice from the drawing unit 124 of the core driver 111.

In the example illustrated in FIG. 2, the borderline plug-in 114 includes only the drawing unit 141 as a module. Hereinafter, it will be explained about a case when a screen display unit that displays a setting screen of the borderline is newly developed and added.

Figure 26:
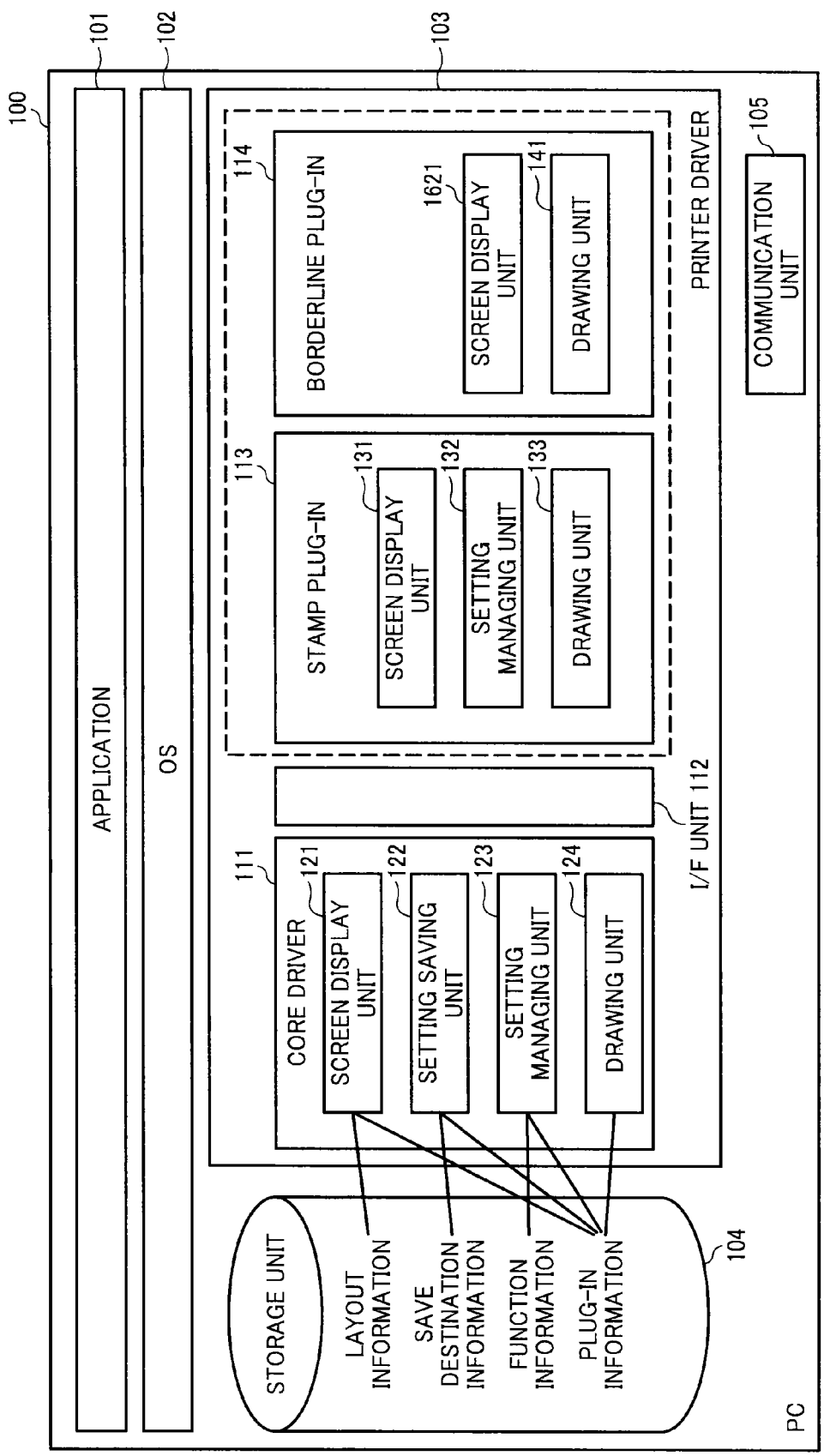

FIG. 26 is a block diagram illustrating the configuration of the PC 100 when a screen display unit 1621 of the borderline plug-in 114 is added.

As illustrated in FIG. 26, in the printer driver 103 of the PC 100, the borderline plug-in 114 further includes the screen display unit 1621 that displays a setting screen.

It will be explained about a procedure of newly adding the screen display unit 1621 to the borderline plug-in 114. This procedure is performed by using an installer in the present embodiment. However, the user can manually perform the procedure.

First, the installer adds a dynamic link library of the screen display unit of the borderline plug-in 114. After that, the installer adds a description related to the screen display unit 1621 of the borderline plug-in 114 to the plug-in information of the storage unit 104.

FIG. 27 is a diagram illustrating the example of plug-in information when the screen display unit 1621 is added to the borderline plug-in 114. As indicated by the reference numeral 2701, the screen display unit 1621 of the borderline plug-in 114 is added to the plug-in information.

As illustrated in FIG. 27, it is assumed that the file name of the dynamic link library of the screen display unit 1621 of the borderline plug-in 114 is "borderlineUI.dll". As for the borderline plug-in 114, the screen display unit 1621 prepares "borderlineUI.dll" and the drawing unit 141 prepares "borderline.dll", which are different dynamic link libraries each other. The dynamic link libraries may be appropriately called out by separately designating different dynamic link libraries in the plug-in information.

Next, the installer deletes the description related to the function of the borderline plug-in 114 from the layout information of the storage unit 104. Then, the installer adds a description related to "PluginDialogButton" for calling out the setting screen of the borderline plug-in 114 to the layout information.

FIG. 28 is a diagram illustrating an example of layout information after the description is modified by the installer when the screen display unit 1621 is added to the borderline plug-in 114. In an example illustrated in FIG. 28, as indicated by the reference numeral 2801, a description related to "PluginDialogButton" is added for the borderline plug-in 114.

Figure 29:
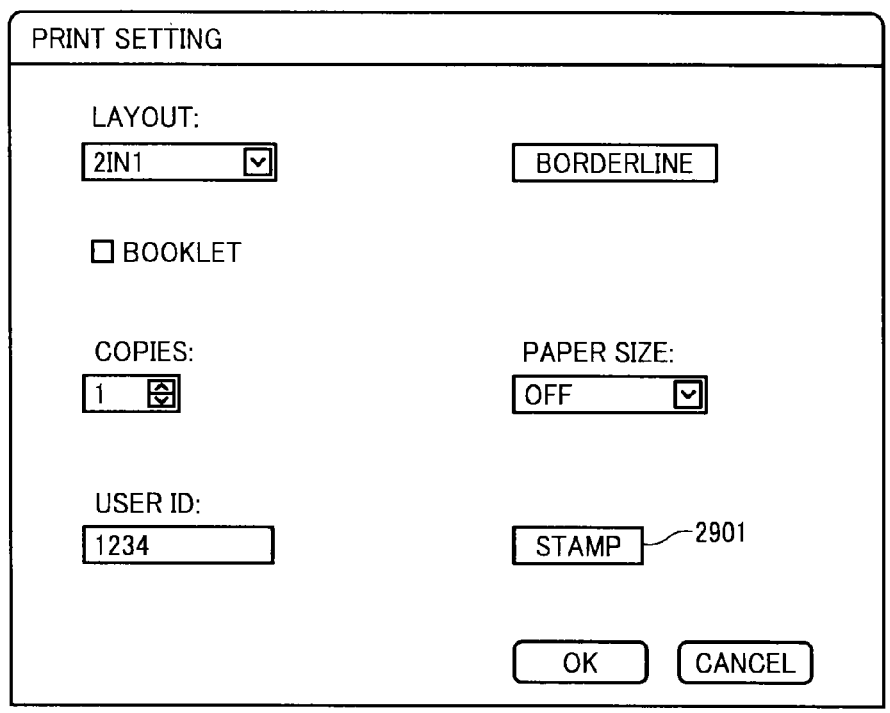

It will be explained about a setting screen that is displayed on the basis of the layout information. FIG. 29 is a diagram illustrating the example of a setting screen that is displayed by the screen display unit 121 of the core driver ill when the screen display unit 1621 is added to the borderline plug-in 114. As indicated by the reference numeral 2901 of FIG. 29, a push button for calling the setting screen of the borderline plug-in 114 is added instead of the check box for ON/OFF of the function of the borderline plug-in 114.

Figure 30:
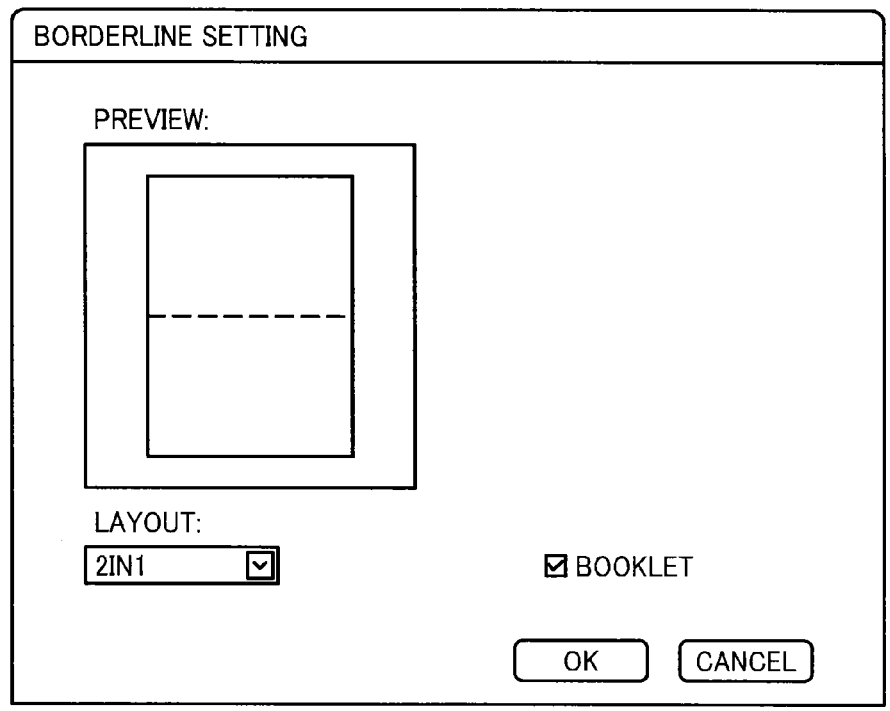

When the push button is pushed down by the user, the screen display unit 1621 of the borderline plug-in 114 displays the setting screen. FIG. 30 is a diagram illustrating an example of a setting screen that is displayed by the screen display unit 1621 of the borderline plug-in 114.

The setting screen of the borderline plug-in 114 illustrated in FIG. 30 displays a simple preview that is a print result of a compaction function and an ON/OFF function of the borderline plug-in 114. The setting related to the borderline plug-in 114 may be accepted through the setting screen.

In this manner, it is not necessary to modify the drawing unit 141 of the borderline plug-in 114 and also is not necessary to modify function information. Even if the borderline plug-in 114 includes a setting saving unit, it is not necessary to modify the setting saving unit. Moreover, because modification is not necessary to perform on a printer driver that has been already installed in the OS 102 except for setting information, it is not necessary to reinstall the printer driver. As a result, the work burden of a user can be reduced.

In other words, the printer driver conventionally has a lot of modules for a screen display, the saving of setting, the management of updating, printing and the like. Therefore, the cost of development becomes high when developing a plug-in that performs all the functions. Because, in the printer driver 103 of the present embodiment, it is necessary to create only a module required in the plug-in and to call out the modules of the printer driver 103 for the other modules, the cost of development can be reduced.

Information is only added to a reference file as a substitute means of each dedicated module of a driver. In this way, a process equal to the case where the dedicated module of the plug-in driver is executed can be realized by executing the module of the printer driver and thus the cost of development of the plug-in driver can be reduced.

Each module of the core driver ill of the printer driver 103 according to the present embodiment can perform the same operation as that of each module of the plug-in as a substitute means of each module of the plug-in only by modifying various types of setting information (layout information, save destination information, function information, and plug-in information). As a result, a cost for developing a plug-in can be lowered.

Moreover, the present invention has a mechanism that a plug-in is divided into a plurality of physical modules and the physical modules are utilized as the components of the same plug-in. As a result, a physical module of a new processing unit can be added without modifying physical modules other than a physical module that is expected to be added. Therefore, the cost of development when adding a process to an existing plug-in can be lowered.

Figure 31:
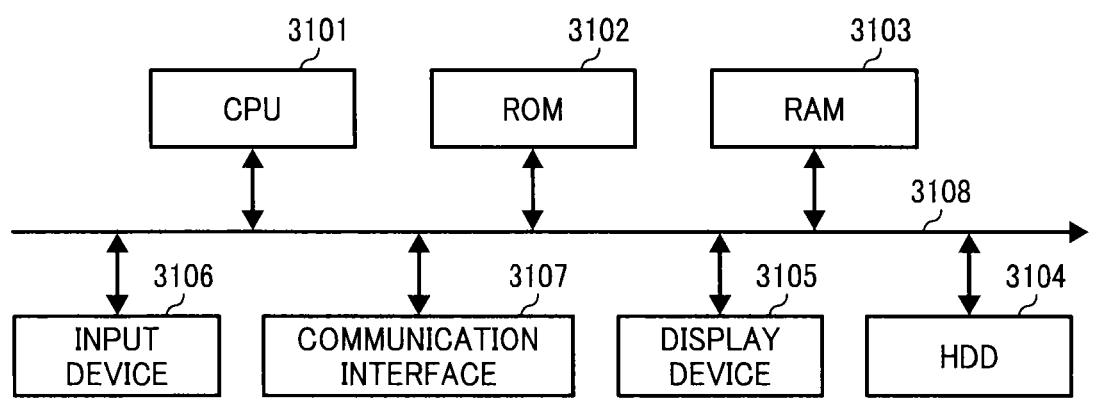
FIG. 31 is a diagram illustrating the hardware configuration of the PC according to the first embodiment.

FIG. 31 is a diagram illustrating the hardware configuration of the PC 100 according to the present embodiment. As illustrated in FIG. 31, the PC 100 includes a CPU 3101, a ROM (Read Only Memory) 3102, a RAM 3103, an HDD 3104, a display device 3105 such as a display unit, an input device 3106 such as a keyboard or a mouse, a communication interface 3107, and a bus 3108 that connects these components. The PC 100 has the hardware configuration of a normal computer.

The printer driver (program) 103 executed in the PC 100 according to the present embodiment is a file that can be installed or executed and is recorded and provided in a computer-readable storage medium such as CD-ROM, flexible disk (FD), CD-R, or DVD (Digital Versatile Disk).

Moreover, the present invention may have a configuration that the printer driver 103 executed in the PC 100 according to the present embodiment is stored in a computer that is connected to a network such as Internet and is downloaded by way of a network. Moreover, the present invention may have a configuration that the printer driver 103 executed in the PC 100 according to the present embodiment is provided or distributed by way of a network such as Internet.

Moreover, the present invention may have a configuration that the printer driver 103 executed in the PC 100 according to the present embodiment is previously incorporated in the ROM to be provided to a user.

The printer driver 103 executed in the PC 100 according to the present embodiment has a module configuration including the components (the core driver 111 and various types of plug-ins) described above. As actual hardware, the CPU 3101 reads out and executes the printer driver 103 from the storage medium to load the components on the RAM 3103 and to generate the core driver 111 and various types of plug-ins on the RAM 3103.

As described above, according to an aspect of the present invention, the development burden of a plug-in can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus that requests print processing to an image processing apparatus, the information processing apparatus comprising:
    a function-information storing unit that stores function-information, the function-information including at least one print processing setting among print processing settings that can be requested to the image processing apparatus;
    a display-information storing unit that stores display-information for displaying display parts, each of which corresponds to each of the print processing settings, on a first display window through which the print processing setting requesting the image processing apparatus is received, and added display-information for displaying a display part, which is added in accordance with addition of a print processing setting that can be requested to the image processing apparatus and corresponds to the added print processing setting;
    a first display unit that determines whether the added print processing setting corresponding to the display part is included in the function-information and displays, on a screen of the information processing apparatus, the first display window based on the display-information and the added display-information and the function-information, the first display window including display through which print processing setting of the added print processing setting determined to be included is received;
    a print-setting storing unit that stores a print processing setting that is accepted through the first display window displayed on the first display unit as print processing setting that requests the image processing apparatus; and
    a second display unit that displays, on the screen of the information processing apparatus, a second display window through which an added print processing setting, which is not included in the function-information among added print processing settings corresponding to the display parts displayed on the first display window, is received.

2. The information processing apparatus according to claim 1, wherein
    the display-information storing unit stores therein display-information for displaying, on the first display window, the display parts, each corresponding to each of the print processing settings included in the function-information.

3. The information processing apparatus according to claim 1, wherein
    the second display unit displays the second display window through which the added print processing setting, which is determined not to be included by the first display unit, is accepted.

4. A method implemented on an information processing apparatus that requests print processing to an image processing apparatus, the method comprising:
    storing function-information, the function-information including at least one print processing setting among print processing settings that can be requested to the image processing apparatus;
    storing display-information for displaying display parts, each of which corresponds to each of the print processing settings, on a first display window through which the print processing setting requesting the image processing apparatus is received, and added display-information for displaying a display part, which is added in accordance with addition of a print processing setting that can be requested to the image processing apparatus and corresponds to the added print processing setting;
    determining whether the added print processing setting corresponding to the display part is included in the function-information and displaying, on a screen of the information processing apparatus, the first display window based on the display-information and the added display-information and the function-information, the first display window including display through which print processing setting of the added print processing setting determined to be included is received;
    storing a print processing setting that is accepted through the first display window as print processing setting that requests the image processing apparatus; and displaying, on the screen of the information processing apparatus, a second display window through which an added print processing setting, which is not included in the function-information among added print processing settings corresponding to the display parts displayed on the first display window, is received.

5. A non-transitory computer-readable storage medium including computer executable instructions, wherein the instructions, when executed by a computer, cause the computer to perform a method that requests print processing to an image processing apparatus, the method comprising:

storing function-information, the function-information including at least one print processing setting among print processing settings that can be requested to the image processing apparatus;

storing display-information for displaying display parts, each of which corresponds to each of the print processing settings, on a first display window through which the print processing setting requesting the image processing apparatus is received, and added display-information for displaying a display part, which is added in accordance with addition of a print processing setting that can be requested to the image processing apparatus and corresponds to the added print processing setting;

determining whether the added print processing setting corresponding to the display part is included in the function-information and displaying, on a screen of an information processing apparatus, the first display window based on the display-information and the added display-information and the function-information, the first display window including display through which print processing setting of the added print processing setting determined to be included is received;

storing a print processing setting that is accepted through the first display window as print processing setting that requests the image processing apparatus; and displaying, on the screen of the information processing apparatus, a second display window through which an added print processing setting, which is not included in the function-information among added print processing settings corresponding to the display parts displayed on the first display window, is received.

\* \* \* \* \*